(12) United States Patent
Schmidt

(10) Patent No.: US 11,847,636 B2
(45) Date of Patent: Dec. 19, 2023

(54) SEAMLESS ELECTRONIC SYSTEM AND METHOD FOR APPLICATION, ACCEPTANCE OF, AUTHORIZING ACCESS TO, AND TRACKING PURCHASES MADE WITH A NEW CREDIT ACCOUNT

(71) Applicant: BREAD FINANCIAL PAYMENTS, INC., Columbus, OH (US)

(72) Inventor: Mike Schmidt, Galena, OH (US)

(73) Assignee: BREAD FINANCIAL PAYMENTS, INC., Columbus, OH (US)

( * ) Notice: Subject to any disclaimer, the term of this patent is extended or adjusted under 35 U.S.C. 154(b) by 715 days.

(21) Appl. No.: 16/571,885

(22) Filed: Sep. 16, 2019

(65) Prior Publication Data

US 2020/0143363 A1 May 7, 2020

Related U.S. Application Data

(60) Provisional application No. 62/755,275, filed on Nov. 2, 2018.

(51) Int. Cl.
*G06Q 20/36* (2012.01)
*G06Q 20/40* (2012.01)
*G06Q 40/03* (2023.01)

(52) U.S. Cl.
CPC ..... *G06Q 20/3674* (2013.01); *G06Q 20/3672* (2013.01); *G06Q 20/40145* (2013.01); *G06Q 40/03* (2023.01)

(58) Field of Classification Search
None
See application file for complete search history.

(56) References Cited

U.S. PATENT DOCUMENTS

| | | | |
|---|---|---|---|
| 2012/0290422 A1* | 11/2012 | Bhinder | G06Q 20/20 705/21 |
| 2016/0019518 A1* | 1/2016 | Sugiyama | G06Q 40/12 705/24 |
| 2016/0267485 A1* | 9/2016 | Walz | G06Q 30/0229 |
| 2018/0053252 A1* | 2/2018 | Koltnow | G06Q 40/025 |
| 2019/0034934 A1* | 1/2019 | Trelin | B60R 16/037 |

* cited by examiner

*Primary Examiner* — Jamie R Kucab

(57) ABSTRACT

A seamless electronic system and method for application, acceptance of, authorizing access to, and tracking purchases made with a new credit account is disclosed. The method uses a mobile device to electronically apply for a new credit account and receive a metadata file formatted for a mobile wallet on the mobile device, the metadata file providing a new credit account for making purchases via a mobile payment. A biometric security is provided to limit access to the new credit account, the biometric security being different than an input needed to access the mobile device. A user is authenticated with the biometric security, prior to receiving access to the new credit account; and initiating a mobile purchase therewith. A digital receipt identifying one or more aspects of the mobile purchase is received.

20 Claims, 15 Drawing Sheets

350

320

↓

ACCESS ONE OR MORE OF A PLURALITY OF DIFFERENT SEARCH LOCATIONS VIA THE CLOUD
321

↓

USES THE USER ID AND DEVICE ID INFORMATION TO PERFORM A PROPRIETARY SEARCH OF A PROPRIETARY DATABASE
322

↓

VERIFY PROPRIETARY INFORMATION USING A CONFIDENCE FACTOR THRESHOLD
323

↓

IF THE INFORMATION CANNOT BE FOUND ON THE PROPRIETARY DATABASE, OR IF THE INFORMATION FOUND DOES NOT OVERCOME THE CONFIDENCE FACTOR THRESHOLD AND CANNOT BE VERIFIED, USING THE USER ID AND DEVICE ID INFORMATION TO PERFORM A SEARCH OF A WIDE VARIETY OF SECONDARY SOURCE DATABASES
324

↓

OBTAINING USER SPECIFIC INFORMATION
223

```
┌─────────────────────────────────────────────────────────────────┐
│ IN RESPONSE TO A CUSTOMER ATTEMPTING TO ACCESS THE NEW CREDIT   │
│ ACCOUNT IN THE MOBILE WALLET FOR PAYMENT: CUSTOMER BIOMETRICS   │
│ ARE REQUESTED FROM THE CUSTOMER'S MOBILE DEVICE                 │
│                              610                                │
└─────────────────────────────────────────────────────────────────┘
                                │
                                ▼
┌─────────────────────────────────────────────────────────────────┐
│           ACCESSING A PHYSICAL LOCATION OF THE MOBILE DEVICE    │
│                              620                                │
└─────────────────────────────────────────────────────────────────┘
                                │
                                ▼
┌─────────────────────────────────────────────────────────────────┐
│         DETERMINING A TIME AT WHICH THE BIOMETRICS ARE ACCESSED │
│                              630                                │
└─────────────────────────────────────────────────────────────────┘
                                │
                                ▼
┌─────────────────────────────────────────────────────────────────┐
│         DETERMINING A DATE AT WHICH THE BIOMETRICS ARE ACCESSED │
│                              640                                │
└─────────────────────────────────────────────────────────────────┘
                                │
                                ▼
┌─────────────────────────────────────────────────────────────────┐
│ ALLOWING TRANSACTION CAPABILITY FOR THE NEW CREDIT ACCOUNT WHEN │
│ THE BIOMETRICS OF THE CUSTOMER, THE COORDINATES OF THE PHYSICAL │
│ LOCATION OF THE CUSTOMER'S MOBILE DEVICE, THE TIME AT WHICH THE │
│ BIOMETRICS ARE ACCESSED, AND THE DATE AT WHICH THE BIOMETRICS   │
│ ARE ACCESSED, ARE WITHIN THE SECURITY REQUIREMENTS              │
│                              650                                │
└─────────────────────────────────────────────────────────────────┘
```

FIG. 6

SEAMLESS ELECTRONIC SYSTEM AND METHOD FOR APPLICATION, ACCEPTANCE OF, AUTHORIZING ACCESS TO, AND TRACKING PURCHASES MADE WITH A NEW CREDIT ACCOUNT

CROSS-REFERENCE TO RELATED APPLICATIONS (PROVISIONAL)

This application claims priority to and benefit of U.S. Provisional Patent Application No. 62/755,275 filed on Nov. 2, 2018, entitled "SEAMLESS ELECTRONIC SYSTEM AND METHOD FOR APPLICATION, ACCEPTANCE OF, AUTHORIZING ACCESS TO, AND TRACKING PURCHASES MADE WITH A NEW CREDIT ACCOUNT" by Mike Schmidt, and assigned to the assignee of the present application, the disclosure of which is hereby incorporated herein by reference in its entirety.

BACKGROUND

Company specific, brand specific or even store specific credit accounts provide significant value to both consumer and provider. By issuing a credit account, the provider is able to tailor rewards offers, provide loyalty discounts and maintain consumer brand loyalty. Similarly, the consumer receives the perks from the reward offers and the loyalty discounts. However, the process for obtaining and utilizing a new credit account includes numerous steps, a delay at the time of check-out, knowledge of a significant amount of personal information, and receipts and bills that are less than clear about what was purchased.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 3B is a flow chart of a method for utilizing the device identifier and the user identifier to obtain user specific information, in accordance with an embodiment.

FIG. 6 is a process flow diagram for providing a customer security evaluation to determine that the customer whose is utilizing the mobile device is actually the customer authorized to access the new credit account in the mobile wallet, in accordance with an embodiment.

DESCRIPTION OF EMBODIMENTS

Figure 1:
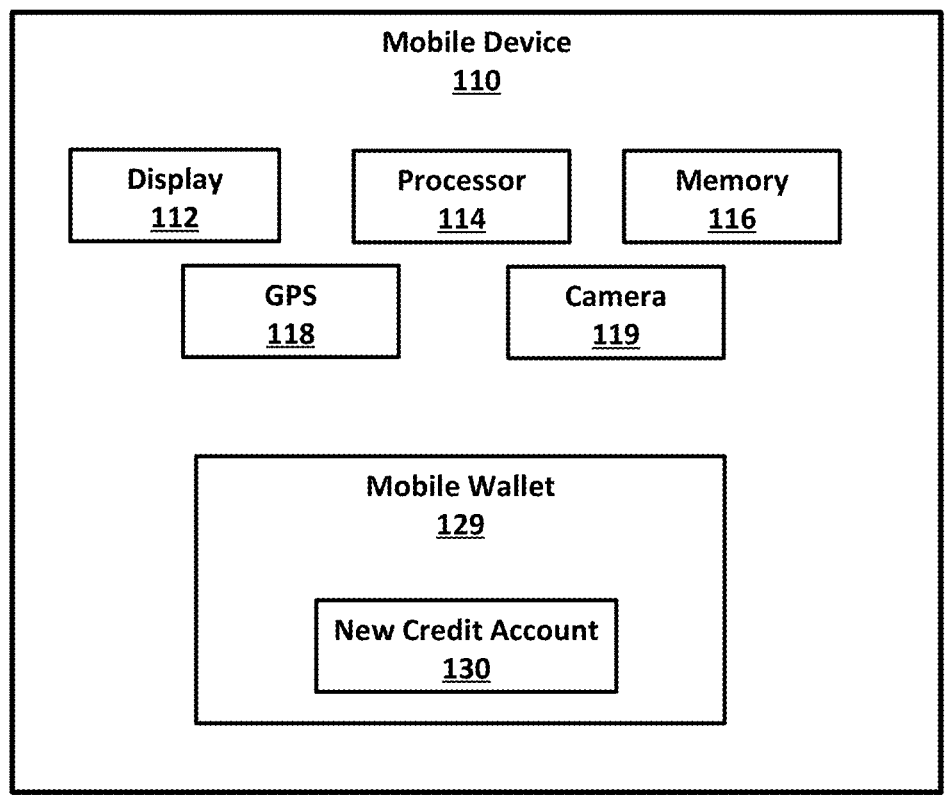
FIG. 1 is a block diagram of a mobile device, in accordance with an embodiment.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "updating", "accessing", "changing", "deciding", "determining", "interacting", "searching", "pinging" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

It should be appreciated that the obtaining, accessing, or utilizing of information conforms to applicable privacy laws (e.g., federal privacy laws, state privacy laws, etc.).

Overview

The discussion provides a novel approach for seamlessly applying for and accepting a new credit account, adding the new credit account to a mobile wallet on a user's mobile device, authorizing access to the new credit account, and electronically tracking authorized purchases made by the new credit account.

In one embodiment, the offer and acceptance occur via interaction with the user through the user's mobile device. In one embodiment, by providing the offers and responses via the user's mobile device the user can receive and review the offer at a less stressful location as compared to when the offer is made by an associate at the point of sale (POS). That is, by moving the offer and acceptance away from the POS the user does not feel "put on the spot" or rushed by other customers in line, etc.

Moreover, after finding out information about the customer, that information can be used for pre-population form filling when forms are provided to the user on the mobile device. In other words, many fields in an application will be pre-populated which will reduce the amount of work a user has to do inputting the information.

In one embodiment, as will be described herein, a mobile credit acquisition with form population that differs significantly from the conventional processes used for consumers to apply for a credit account is disclosed. In conventional approaches, when filling out the forms to apply for credit, the consumer must key in a lot of information such as name, address, phone number, birthday, identification number, etc. Such conventional approaches are error prone, tedious, time-consuming, and often times a user will quit the process before it can be completed. Instead, the present embodiments, as will be described and explained below in detail, provide a previously unknown procedure for reducing the amount of data a consumer has to key by locating the consumer's name, address and other personal information via automated searches. Thus, embodiments of the present invention provide a streamlined method for mobile credit acquisition which extends well beyond what was previously done by hand.

As will be described in detail, the various embodiments of the present invention do not merely implement conventional mobile credit acquisition processes on a computer. Instead, the various embodiments of the present invention, in part, provide a previously unknown procedure for reducing the amount of data a consumer has to key by locating the consumer's name, address and other personal information via automated searches. Hence, embodiments of the present invention provide a novel process for mobile credit acquisition with form population which is necessarily rooted in computer technology to overcome a problem specifically arising in the realm of digital customer key fatigue.

In one embodiment, the new credit account can be added to the mobile wallet on the user's mobile device as either a pass or a card. In one embodiment, the new credit account is placed in the mobile wallet and linked to one or more of a plurality of payment options such as store brand credit accounts, rewards accounts, coupons, offers, non-branded credit accounts, etc.

In one embodiment, electronically tracking authorized purchases made by the new credit account begins when a credit purchase is processed at a point of sale (POS) such as a retail store, website, or the like, and a digital fingerprint of the purchase is created. For example, the customer provides the new credit account from the mobile wallet. The POS will use contact the credit account company or its agent (hereinafter credit authorizer) for authorization to accept the purchase. In one embodiment, the credit authorizer will generate an authorization number which is similar to a bank identification number (BIN), issuer identification number (IIN), or the like. In one embodiment, the authorization number will have a pre-defined number of digits and the digits will be used to both authorize the purchase and provide an identifier about the purchase for any later question, dispute, concern or other metric/analysis. In addition, indicators will be used at certain locations within the authorization number and the indicators will identify aspects of the purchase such as: a type of payment (e.g., mobile, physical, virtual), a customer identifier (e.g., mobile device identifier, account number), a store identifier (e.g., store #, clerk, manager, etc.), purchase amount, and the like.

In so doing, when the credit authorizer provides the authorization number that authorizes the purchase at the POS, the credit authorizer will have access to the analytics/information in the authorization number and will be able to use them to identify the transaction throughout the purchase life cycle, e.g., from authorization, settlement, billing and dispute resolution.

Importantly, the embodiments of the present invention, as will be described below, provide an approach for seamlessly applying for a credit account, adding the new credit account to a mobile wallet on a user's mobile device, authorizing access to the new credit account, and electronically tracking authorized purchases made by the new credit account, which differs significantly from the conventional processes used across the many different aspects of credit acquisition, verification, utilization, and settlement. In conventional approaches, the credit/reward/coupons were found in one or more of a combination of a piece of plastic, a piece of paper, an electronic mail, an attachment to an email, a mailer, a plurality of different applications on a mobile device, a plurality of different cards in a mobile wallet, and the like. As such, it was likely that a customer would not have (or easily access, find, etc.) one or more coupons/rewards/credit accounts, etc. available to them at the time of purchase. For example, the coupons and rewards could be in pockets, in emails, spread through a plurality of applications on the customer's mobile device, etc.

Since the customer receives offers, coupons, rewards memberships, and different credit accounts, via the mail, register receipts, electronic aspects (e.g., email, mobile cards in a mobile wallet, etc.) via the internet, and the like, the ability to track and properly utilize different credit accounts, coupons, offers, rewards, points, and the like cannot be simply adjusted to use on a computing device or handled over a network. Instead, the present embodiments described herein, require a completely new and different system than that which is presently used. Moreover, ensuring that the customer's appropriate credit account, rewards, offers, coupons and the like, are available and used at the time of transaction is different than even the present use of mobile payment that is performed at the POS. For example, even when paying electronically, the receipt is paper that is handed to the customer and includes a number of offers, coupons, etc. Further, even if the receipt is electronically provided it is emailed, texted or the like and will often not include the offers that are provided on the paper receipt. As such, a new and different solution that is completely network-centric is disclosed.

For example, finding the appropriate paper, plastic, or electronic credit account, reward information, coupons and the like is tedious, time-consuming, and often causes worry or concern if the appropriate items cannot be quickly found at the time of checkout, especially if there is a line of other customers waiting. In many cases, the customer simply forgoes finding the proper credit account, coupon, reward, or the like in order to not hold up the line, feel the stares of other customers, or the like. However, the present embodiments, as will be described and explained below in detail, provide a previously unknown and Internet-centric procedure for obtaining and utilizing a new credit account in the mobile wallet of the customer's mobile device to provide a customer with the appropriate credit account, rewards, coupons, and offers at the time of purchase.

Thus, embodiments of the present invention provide a capability to link credit accounts, reward accounts, coupons, offers, and the like, which is completely different than what was previously done because of the Internet-centric centralized aspect of the new credit account.

As will be described in detail, the various embodiments of the present invention do not merely implement conventional mobile payment processes on a mobile device. Instead, the various embodiments of the present invention, in part, provide a novel process for utilizing a single new credit account to provide some or all aspects of the purchasing process, which is necessarily rooted in Internet-centric computer technology to overcome a problem specifically arising in the realm of mobile device electronic payment.

Further, the embodiments of the present invention, as will be described below, provide an approach for tracking authorized purchases which differs significantly from the conventional processes used to authorize purchases. In conventional approaches, when a purchase is authorized there is minimal identification information or purchase analytics associated with the purchase. Here, the solution, as will be described and explained below in detail, provides a previously unknown procedure to identify the transaction throughout the purchase life cycle, e.g., from authorization, through settlement all the way to billing. Moreover, the present embodiments provide real-time analytics for the credit authorizer and/or retailer such as: the type of payment (e.g., mobile, physical, virtual), the customer identifier (e.g., mobile device identifier, account number), the store identifier (e.g., store #, clerk, manager, etc.), the purchase amount, and the like. Thus, embodiments of the present invention provide an approach for tracking authorized purchases which extends well beyond what was previously done by hand.

As will be described in detail, the various embodiments of the present invention do not merely implement conventional monitoring of processes on a computer. Instead, the various embodiments of the present invention, in part, provide a previously unknown procedure to identify the transaction throughout the purchase life cycle, e.g., from authorization, through settlement all the way to billing. Moreover, the present embodiments provide real-time analytics for the credit authorizer and/or retailer such as: the type of payment (e.g., mobile, physical, virtual), the customer identifier (e.g., mobile device identifier, account number), the store identifier (e.g., store #, clerk, manager, etc.), the purchase amount, and the like. Hence, embodiments of the present invention provide a novel process for tracking authorized purchases which is necessarily rooted in computer technology to overcome a problem specifically arising in the realm of real-time analytics for the credit authorizer and/or retailer.

Moreover, the embodiments do not recite a mathematical algorithm; nor do they recite a fundamental economic or longstanding commercial practice. Instead, they address a business challenge that has been born in the Internet-centric environment. Thus, the embodiments do not "merely recite the performance of some business practice known from the pre-Internet world along with the requirement to perform it on a computing device." Instead, the embodiments are necessarily rooted in network-centric environments in order to overcome numerous problems specifically arising in the realm of mobile payment, that start with the application and acceptance, through the generation of the digital credit account (which may include a link to rewards, offers, and the like), and finally to authorizing transactions and providing electronic receipts. In so doing, significant steps are removed from the customer's obligations and the customer's time is saved; the use of paper, plastic, or other printed matter is almost completely removed from the entire process providing a significant reduction in resource waste and printing/manufacturing costs; and the utilization of a new and completely different electronic receipt format lets stores, credit account providers and customers obtain significantly more information about a transaction than what is presently available.

Operation

Referring now to FIG. 1, a block diagram of a mobile device 110 is shown. Although a number of components are shown as part of mobile device 110, it should be appreciated that other, different, more, or fewer components may be found on mobile device 110.

In general, mobile device 110 is an example of a customer's mobile device. Mobile device 110 could be a mobile phone, a smart phone, a tablet, a smart watch, a piece of smart jewelry, smart glasses, or other user portable devices having wireless connectivity. For example, mobile device 110 would be capable of broadcasting and receiving via at least one network, such as, but not limited to, WiFi, Cellular, Bluetooth, NFC, and the like. In one embodiment, mobile device 110 includes a display 112, a processor 114, a memory 116, a GPS 118, a camera 119, and the like.

Mobile device 110 also includes a mobile wallet 129 which is an electronic application that operates on mobile device 110. Mobile wallet 129 includes new credit account 130. In general, new credit account 130 allows a customer to utilize a single mobile payment method that is linked to one or more credit account information, reward account information, offers, coupons, and the like, and is carried in a secure digital form on a mobile device 110. Instead of using a physical plastic card to make purchases, a mobile wallet allows a customer to pay via mobile device 110 in stores, in apps, or on the web.

GPS 118 can generate and provide location information with respect to the customer's mobile device. The output from GPS 118 could be utilized by an operating system of mobile device 110, an application (app) loaded on mobile device 110, a web based app accessed over a network by mobile device 110, or the like. In one embodiment, the output from GPS 118 could be provided to another computing system for identification purposes, fraud determination/evaluation, etc. In one embodiment, instead of providing GPS information, the location of mobile device 110 may be determined within a given radius, such as the broadcast range of an identified beacon, a WiFi hotspot, overlapped area covered by a plurality of mobile telephone signal providers, or the like.

Figure 2A:
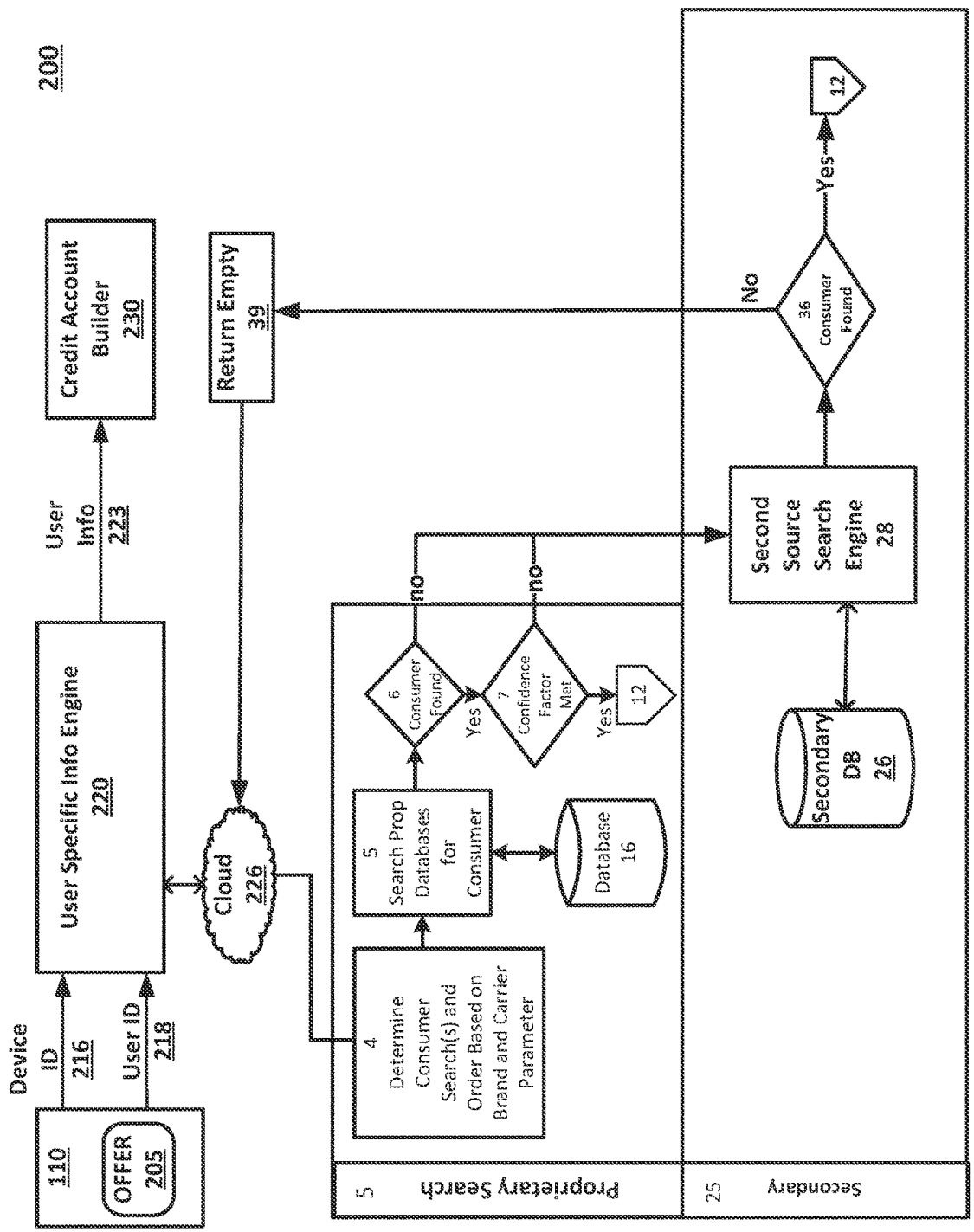
FIG. 2A is a block diagram of a user specific information engine accessing one or more different search locations, in accordance with an embodiment.

Referring now to FIG. 2A, a block diagram of a mobile credit acquisition system 200 is shown in accordance with an embodiment. In one embodiment, mobile credit acquisition system 200 includes an offer 205, a user specific information engine 220 and a credit account builder 230. Although a number of applications and components are shown in mobile credit acquisition system 200, it should be appreciated that the components and applications may be located separately from one another. For example, one or more of the components and applications may be found on one or more locations, such as, but not limited to a computer in the retail store, a server at a remote location, on the cloud 226 or the like.

In general, offer 205 is an incentive offer for a user intended to be redeemed via a user's mobile device. For example, offer 205 may be a digitally redeemable incentive, an offer for a credit account, or the like. For example, the offer may be a discount percentage, a free gift, a coupon, a surprise gift, a surprise reward, or the like. Offer 205 may be located on a physical item such as a poster, or the like and include a visual code such as a barcode, a QR code, a number to text, an email address to reply to, or the like. In another embodiment, offer 205 is received by the user's mobile device, e.g., via a beacon broadcast, WiFi broadcast, email, text, SMS, social media alert, app alert, or the like. In yet another embodiment, offer 205 may be provided by an app on the user's mobile device once the mobile device is within a certain vicinity of the store providing the offer.

A number of different options may be available to respond to the offer 205. For example, the response may be in the form of a message interaction such as shown and described in further detail in FIGS. 4A through 4C. In one embodiment, the response to the offer includes providing a mobile device ID 216 and a user ID 218.

In general, device ID 216 can be the mobile device's phone number, SIM card integrated circuit card identifier (ICCID), unique device identifier (UDID), or the like.

User ID 218 can be the user's zip code, social security number or portion thereof, driver's license number or portion thereof, or the like that is used to identify a specific user.

Thus, a user's response to offer 205 will include enough information for the mobile credit acquisition system 200 to perform a credit account qualification of the user for purposes of providing the user with a new credit account.

In one embodiment, user specific information engine 220 will receive a message from a user's mobile device 110 in response to the offer 205. The message will include device ID 216 and user ID 218.

In one embodiment, user specific information engine 220 will use device ID 216 and user ID 218 to obtain user specific information 223 to prepopulate an electronic form such as a credit application. In general, user specific information 223 could be at least two of: a name and full or partial address, a driver's license number, a social security number, or the like.

For example, user specific information engine 220 may access the different search locations via the cloud 226. An example of cloud 226 is a network such as the Internet, local area network (LAN), wide area network (WAN), or the like.

One embodiment uses the device ID 216 and user ID 218 information to perform a proprietary search 5 of at least one proprietary database 16. In general, the proprietary database 16 may be one or more databases such as a credit accounts database, or the like, that store a company's private database such as an Alliance Data Legacy database or the like. Proprietary database 16 will include user specific information 223 for customers that have existing accounts with the company, have previously applied for an account, or the like.

In one embodiment, the proprietary search 5 will only search a database related to a specific company. For example, if the credit account builder is a specific company, e.g., Nash's skate and bike emporium, then in a company specific database search, only the existing customer information related to Nash's skate and bike emporium will be searched. For example, a check is performed to see if the customer has an existing brand account, e.g., is already an existing customer in the database.

However, if the proprietary search 5 is for a group of companies, a shared information database, or the like, then all of the customer information in the databases may be searched for a match with the device ID 216 or the user ID 218. For example, if the database includes Nash's skate and bike, Mike's hardware, and Tarrin's dress stores, and all three companies are sharing information, then the search would encompass all three store's databases of information.

For example, search an internal accountholder database 16 to see if the consumer has another account within the shared information database. For example, if the customer does not have a Nash's skate and bike account, the underlying credit account, e.g., Alliance Data database is searched to see if the customer has an account at a different brand issued by Alliance Data.

In one embodiment, consumer information 6 that is found in the proprietary database 16 will be verified using a confidence factor 7. For example, if only one record is found and it is 5 days old, the confidence in the found records would likely be below the confidence factor threshold. In contrast, if 2 years of records are found, records such as prior accounts, present accounts, memberships, rewards information, and the like, then the confidence in the user specific information 223 found in the records would be above the confidence factor threshold. If the user specific information 223 is above the confidence threshold, then the user specific information 223 is deemed valid. At that point, the user specific information 223 is returned via return information 12 to user specific info engine 220 and then passed on to credit account builder 230.

One embodiment incorporates one or more of several fraud mitigation business rules to attempt to prevent fraudulent activity; e.g., to validate the found records. These business rules include logic that looks at specific activity on a consumer's account that point to potential fraudulent activities. In addition, fraud mitigation tool may be implemented. The fraud mitigation tool will use device and internet protocol (IP) information to predict if the credit application can be trusted or will eventually become fraudulent.

For example, in one embodiment, the fraud mitigation will ignore any credit accounts that meet situations such as, but not limited to, the following: It is associated with a brand(s) that has been determined to have a high propensity for fraud. It is currently in a derogatory status. The account was opened within a defined number of days, where the number of days is controlled by internal parameter and can be tightened, loosened or turned off. The phone number matched has been changed within a defined number of days, where the number of days is controlled by internal parameter and can be tightened, loosened or turned off. An authorized buyer has been added to the account within a defined number of days, where the number of days is controlled by internal parameter and can be tightened, loosened or turned off. The address has been changed within a defined number of days, where the number of days is controlled by internal parameter and can be tightened, loosened or turned off. The account has been inactive within a defined number of months, where the number of months is controlled by internal parameter and can be tightened, loosened or turned off. Multiple accounts are found for the mobile phone number, zip code and last 4 digits of the SSN but all accounts are not the same person; and the like.

If no user specific information 223 is found during the proprietary search 5 or if the found user specific information 223 cannot be validated, then the device ID 216 and user ID 218 are passed on to a secondary search 25. At secondary search 25, a second source search engine 28 will search at least one secondary source database 26. One example of secondary source database 26 is a reverse phone number look up such as reverse phone look-up. However, other secondary source databases may be searched such as, but not limited to: social media sites, search engines, online public and/or private records, reverse name and phone number engines, and the like. In one embodiment, the user specific information 223 may be obtained by performing a secondary source database 26 search with the user ID 218 and the device ID 216.

In one embodiment, the secondary search 25 may be for example, a real-time call to a reverse phone look-up product to try and locate the consumer. In general, reverse phone look-up products provide accurate and current consumer telephone information. In many cases, the data is updated regularly from a broad range of sources, including regional bell operating companies, white pages and proprietary sources. One embodiment also integrates validation and authentication aspects that add further benefits to append address information for a consumer. In general, validation and authentication aspects match consumer name and zip code information that was returned from the reverse phone look-up, against data from a secondary source to return full address data.

If consumer information 36 is found, then the user specific information 223 is returned via return information 12 to user specific info engine 220. If no user specific information 223 is found from the secondary search 25, then no user specific information 223 will be pre-populated into the forms. That is, the user specific info engine 220 will receive a return empty 39. However, if a match is made, then the user specific information 223 can be used to prepopulate a portion of the application. E.g., name, address, city, state, zip, mobile phone number, email, etc. of the application.

This is a benefit of the mobile credit acquisition with form population capability. Utilizing the form population reduces the amount of data a consumer has to key by locating the consumer's name and address via automated searches.

In another embodiment, when a consumer has to enter or change their address and begins to type their address, a search is invoked that returns a list of potential results based on the zip code that was entered in the initial user experience. As more characters are typed the picklist is refined to display closer matches. When the address is selected, it will be checked for completeness and the associated city and state will be auto pre-filled.

Figure 2B:
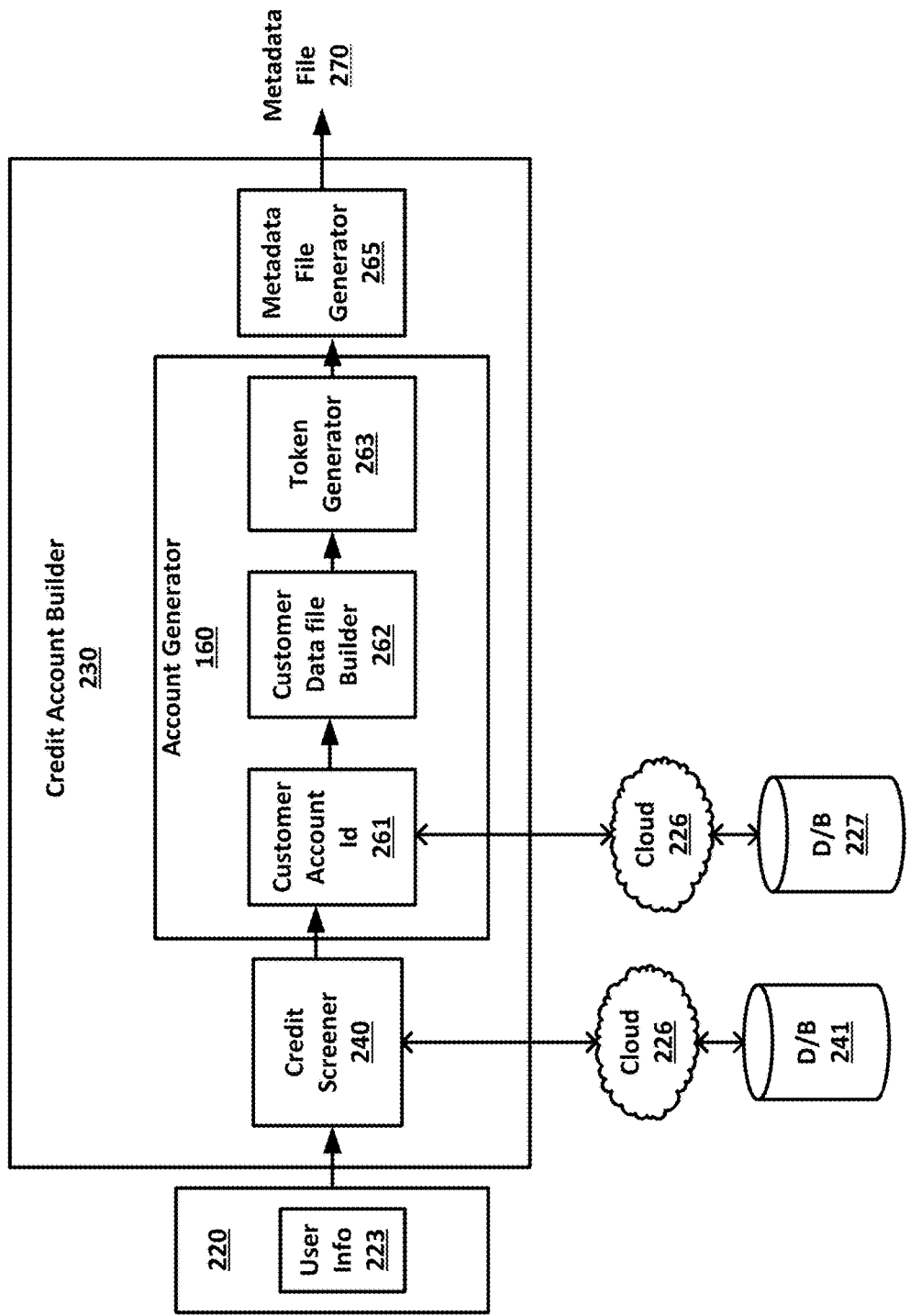
FIG. 2B is a block diagram of a system for adding a new credit account with purchase capability to a mobile wallet, in accordance with an embodiment.

Referring now to FIG. 2B, a block diagram of a system 250 for adding a new credit account with purchase capability to mobile wallet 129 of a customer's mobile device 110 is shown in accordance with an embodiment. In one embodiment, system 250 shows the user specific information engine 220 providing the user specific information 223 to credit account builder 230 is shown in accordance with one embodiment. In one embodiment, credit account builder 230 includes a credit screener 240, a new credit account generator 160, and a metadata file generator 265. Although a number of applications and components are shown, it should be appreciated that there may be more of fewer components and applications of credit account builder 230. Moreover, different pieces may be combined, re-organized, located separately from one another, or the like.

In general, credit screener 240 accesses a database 241, such as a credit reporting agency, via cloud 226 to determine credit information for the user based on the user specific information 223. An example of cloud 226 is a network such as described herein. The credit reporting agency could be a company such as, but not limited to, Experian, Equifax, TransUnion, Innovis and the like.

Credit screener 240 will analyze the user's credit information obtained from the credit reporting agency database 241 to determine if the user passes a credit criteria. If the user does not pass the credit screening process, no further action is taken by mobile credit acquisition system 250.

In one embodiment, after the user passes the credit screening then credit account builder 230 provides an application for a credit account to the user's mobile device. In one embodiment, credit account builder 230 populates the application for a credit account with the user specific information 223 as shown in 437 of FIG. 4C. That is, credit account builder 230 will place the user specific information 223 provided by the user specific information engine 220 into the forms that are provided to the user's mobile device. By populating the forms prior to presenting them to the user, the abandonment rate will be improved as the acceptance process will be shortened due to the pre-filling of the customer's information into the acceptance forms.

Figure 10:
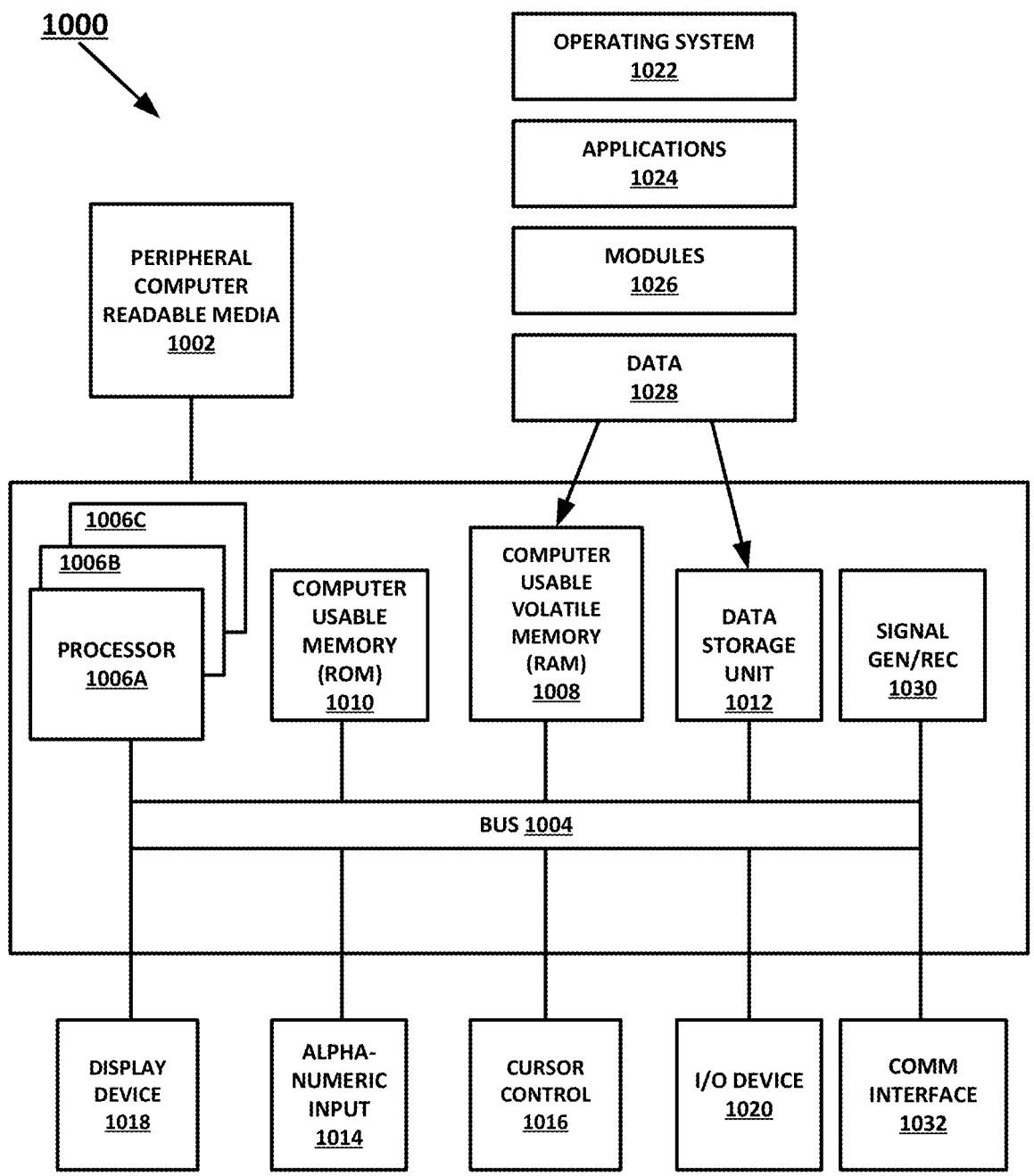
FIG. 10 is a block diagram of an example computer system with which or upon which various embodiments of the present invention may be implemented.

In one embodiment, credit account builder and/or new credit account generator 160 are computing systems similar to computer system 1000 described in detail in the FIG. 10 discussion herein. In one embodiment, new credit account generator 160 includes a customer account identifier 261, a customer data file builder 262, a token generator 263, and a metadata file generator 265.

In one embodiment, once the user completes the new credit account application, new credit account generator 160 will receive the information in the new credit account application from credit screener 240.

In one embodiment customer account identifier 261 accesses database 227 which stores a plurality of customer credit accounts and utilizes the user specific information 223 in order to identify any other accounts related to the customer. In one embodiment, customer account identifier 261 accesses database 227 via cloud 226. An example of cloud 226 is a network such as the Internet, local area network (LAN), wide area network (WAN), or the like. Database 227 may include store specific data, brand specific data, retailer specific data, a shared database, a conglomerate database, a portion of a larger storage database, and the like. Moreover, database 227 could be a local database, a virtual database, a cloud database, a plurality of databases, or a combination thereof.

In one embodiment, database 227 stores a plurality of customer credit accounts, a plurality of customer reward accounts and/or offers, coupons, and the like. Customer account identifier 261 searches database 227 for one or more customer accounts (e.g., credit accounts, reward accounts, and/or offers, coupons, and the like) that are held by the identified customer. If any other customer accounts are found, they are provided by the customer account identifier 261 to customer data file builder 262 which links the one or more customer accounts with the new credit account information to build a customer data file.

Token generator 263 then generates a token identifying the customer data file. In one embodiment the token is an identification number, hash, or other type of anti-tamper encrypted protection that is generated as an identifier for the customer data file.

Metadata file generator 265 generates a metadata file 270 formatted for mobile wallet 129, the metadata file 270 including the new credit account 130 and the token. In one embodiment, the new credit account 130 could include an image and the token is embedded within the image data. In another embodiment, the token could be separate from the image that is presented when new credit account 130 is accessed and would be provided at the time of the transaction. For example, the token could be provided via a near field communication (NFC) between the mobile device 110 and the POS when new credit account 130 is presented at the POS. In another embodiment, the entire new credit account 130 metadata file 270 could be provided via NFC at the time of the transaction and no imagery would be obtained by the POS even if it was presented on the display 112. In one embodiment, metadata file 270 includes an instruction that causes the new credit account 130 to be placed in a first location of mobile wallet 129 on the customer's mobile device 110.

The metadata file 270 is then provided from the credit account builder 230 (e.g., a credit provider computer system, third-party computing system, or the like) to the customer's mobile device 110. The metadata file 270 is added to mobile wallet 129 on the customer's mobile device 110, wherein an access of the metadata file 270 in the mobile wallet causes the new credit account 130 to be presented by the customer's mobile device 110. In general, the presentation of new credit account 130 by the customer's mobile device 110 could be audible, visual, or the like, to provide payment at a time of a customer purchase as described herein.

In one embodiment, new credit account 130 is instantly available to be used as a form of payment. Additional details regarding the digital credit account identifier are shown and described with reference to FIGS. 4A through 4C herein.

Figure 3A:
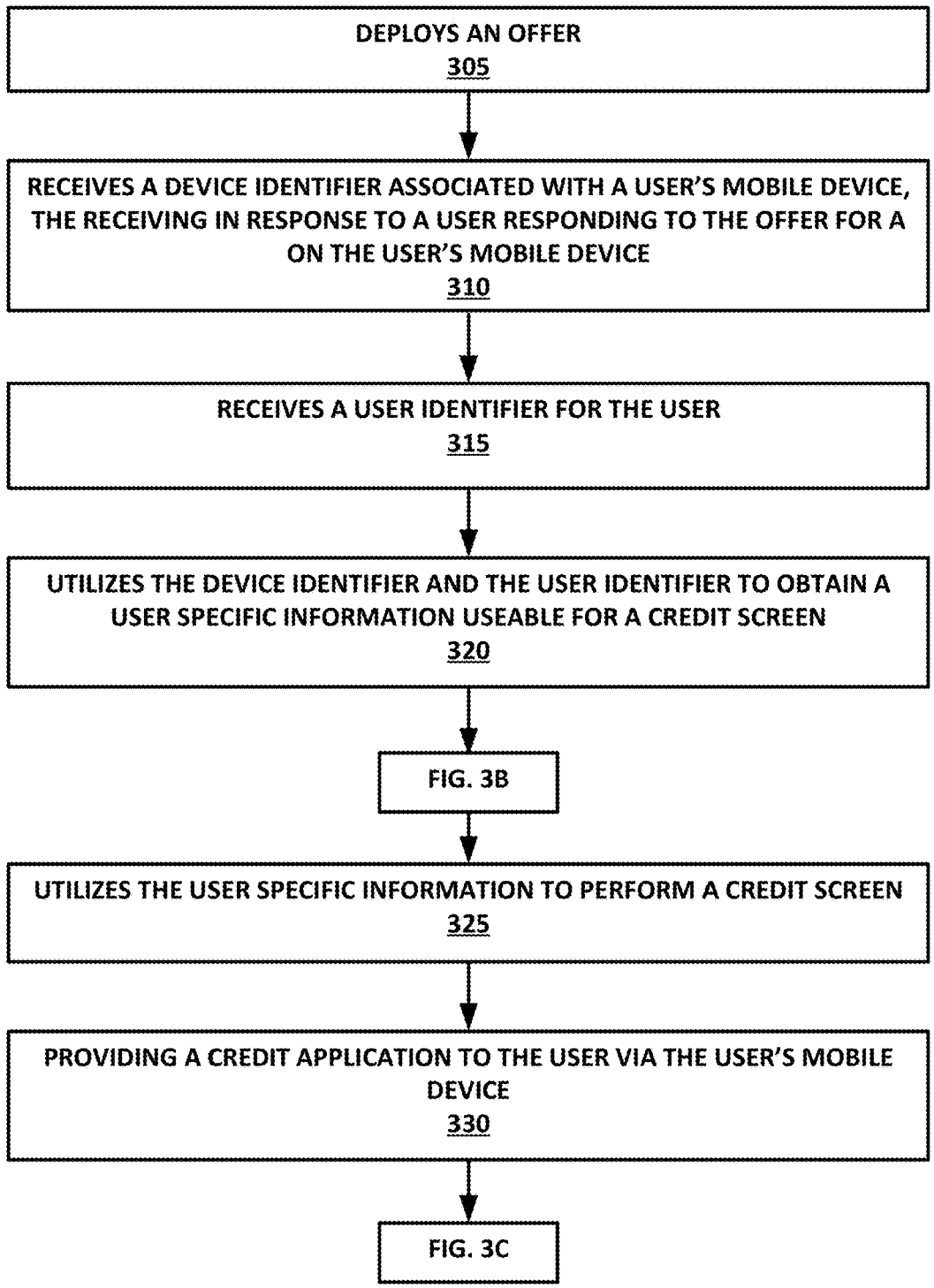
FIG. 3A is a flow chart of a method for mobile credit acquisition, in accordance with an embodiment.
Figure 4A:
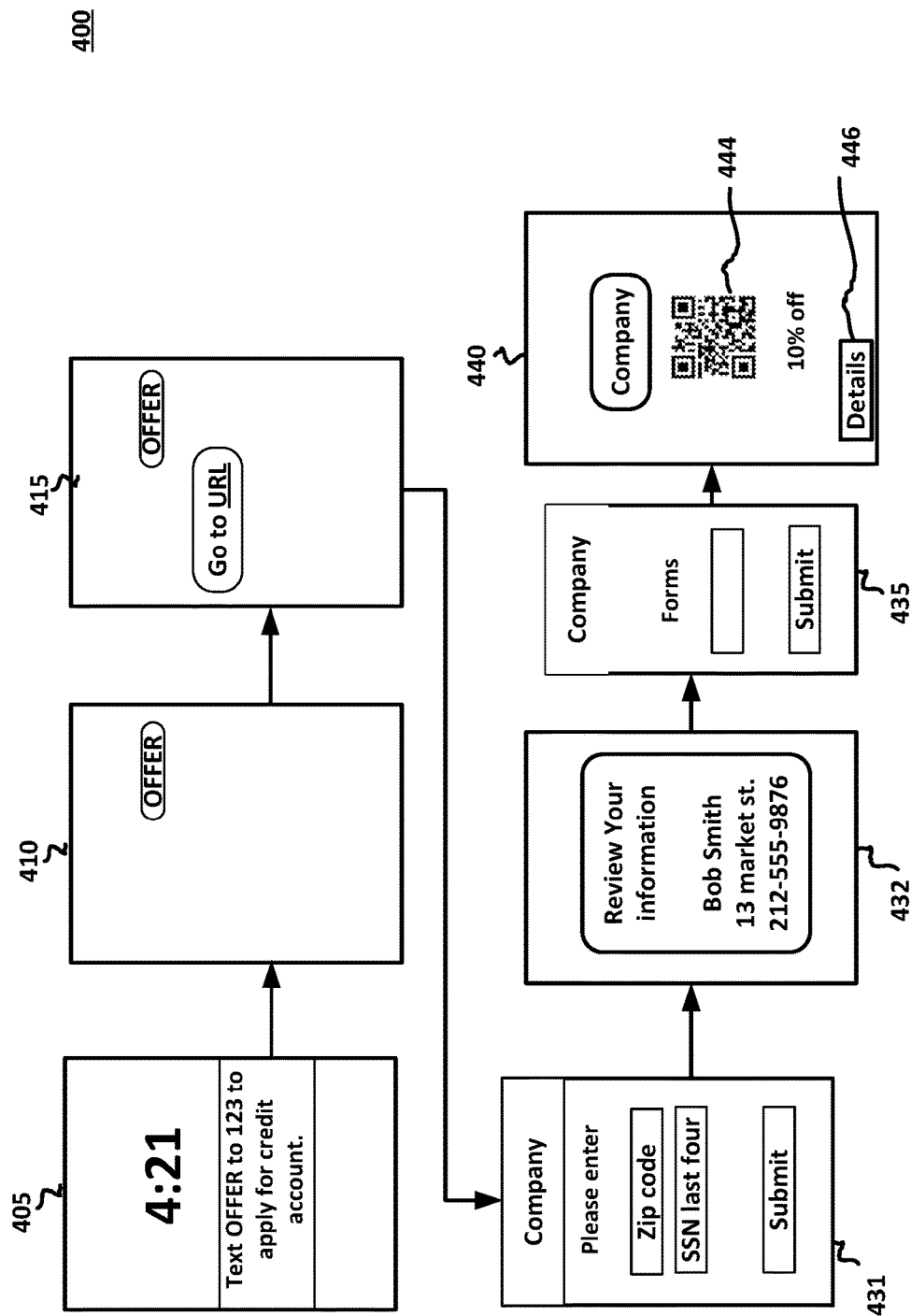
FIG. 4A is a block diagram of a mobile direct credit application as viewed on a user's mobile device, in accordance with an embodiment.
Figure 4B:
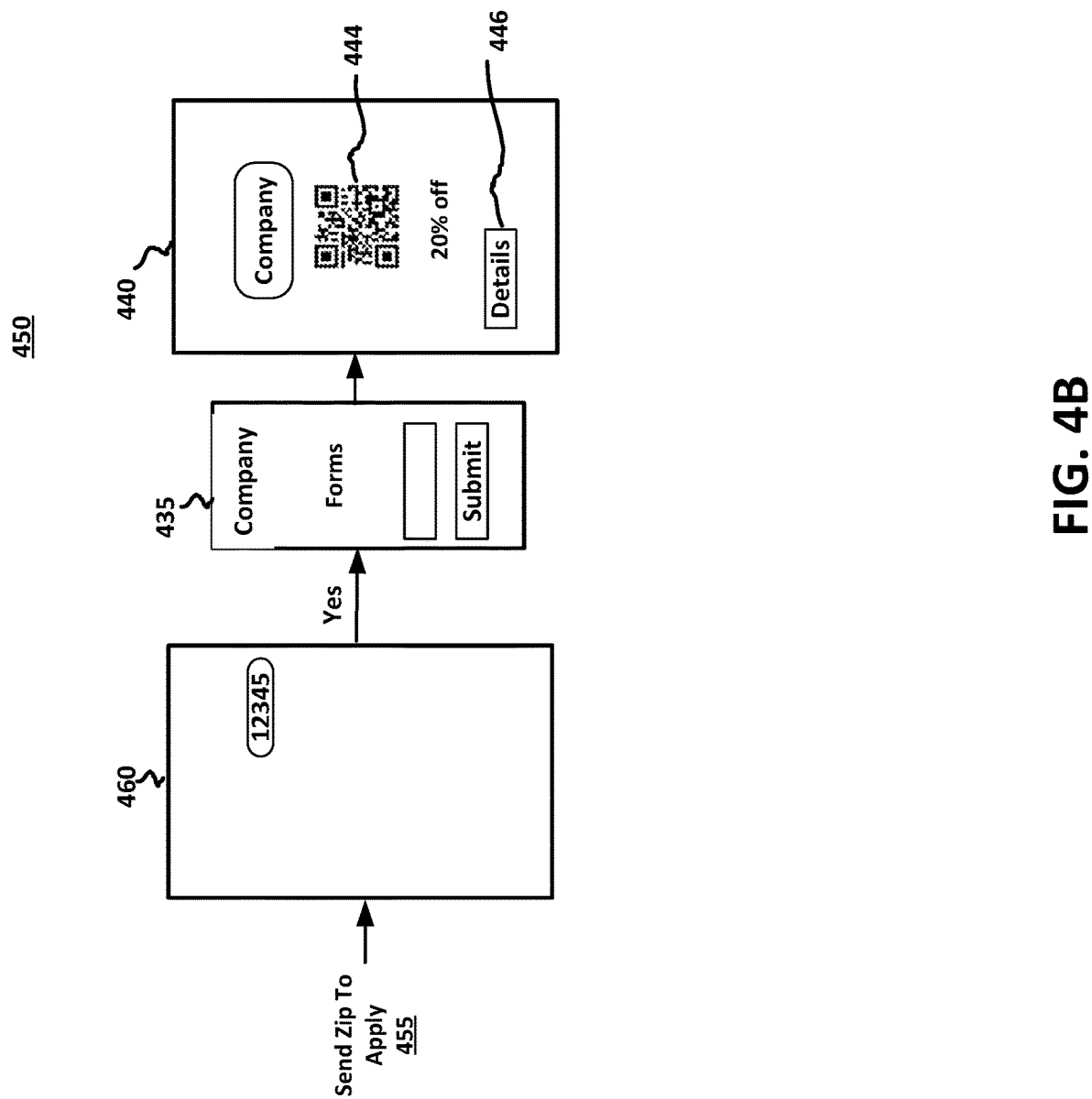
FIG. 4B is a block diagram of another embodiment for mobile credit acquisition as viewed on a user's mobile device, in accordance with an embodiment.
Figure 4C:
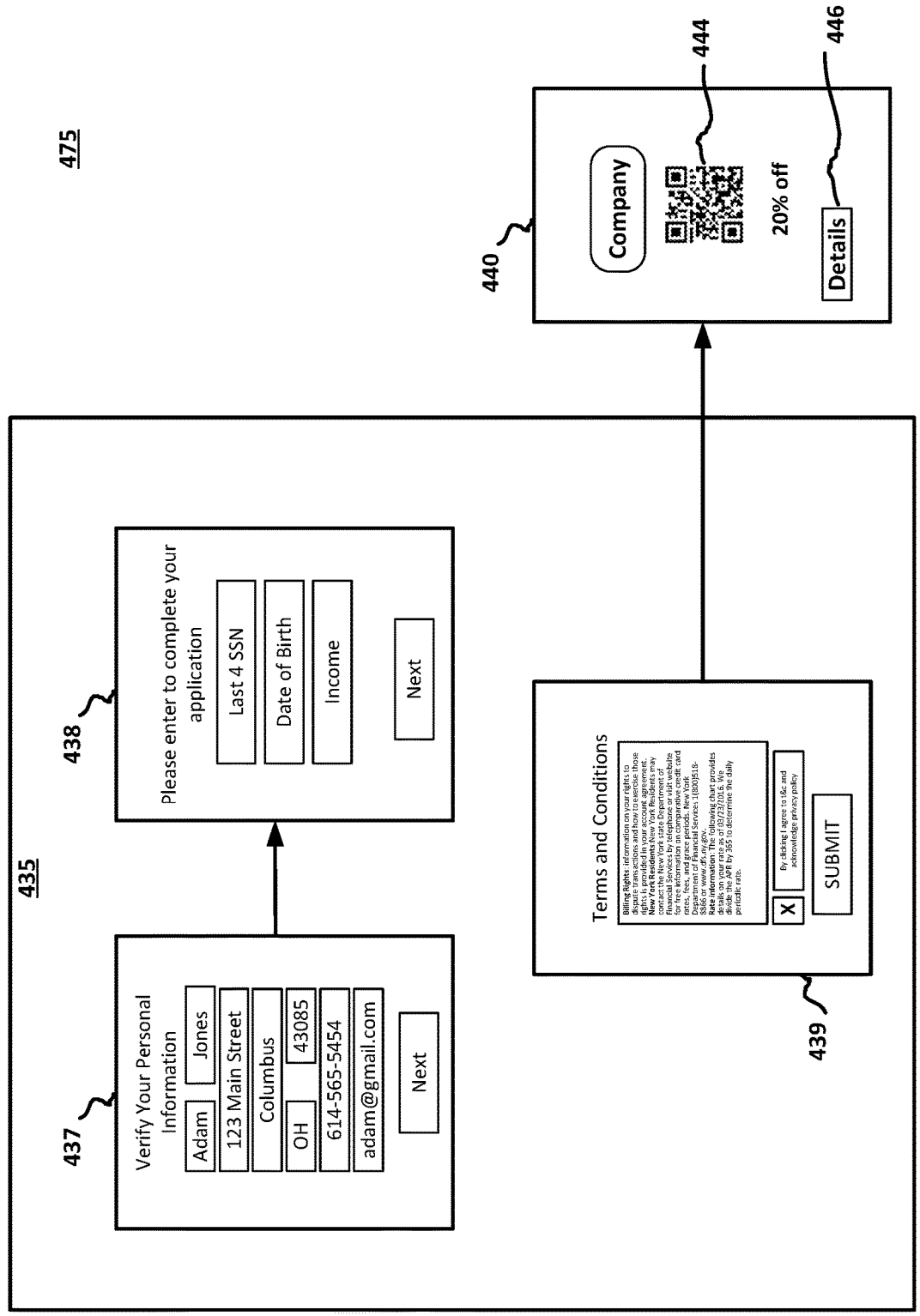
FIG. 4C is a block diagram of an embodiment for mobile credit acquisition having prepopulated form information as viewed on a user's mobile device, in accordance with an embodiment.

With reference now to FIG. 3A, a flowchart 300 of a method for mobile credit acquisition is shown in accordance with an embodiment. FIGS. 4A through 4C are also utilized to provide clarity and support for the discussion of flowchart 300. FIG. 4A is a block diagram 400 of a mobile credit acquisition as viewed on a user's mobile device shown in accordance with an embodiment. FIG. 4B is a block diagram 450 of a mobile direct credit application as viewed on a user's mobile device, in accordance with an embodiment. FIG. 4C is a block diagram 475 of an embodiment for mobile credit acquisition having prepopulated form information as viewed on a user's mobile device. Although the interactions between user's mobile device and the offeror are shown in the format of text messages, it should be appreciated that the interactions may be made via one or more of: a beacon broadcast, WiFi broadcast, email, text, SMS, social media alert, app alert, or the like.

With reference now to 305 of FIG. 3A, one embodiment deploys offer 205. One embodiment deploys the offer 205 in a physical location within a retail store such as shown and described with reference to FIG. 5 herein. In another embodiment, offer 205 is provided to the user's mobile device 110 when a location of the user's mobile device is in proximity to a retail store. In one embodiment, offer 205 is an offer to open a new credit account with the retailer, or the like. In one embodiment, offer 205 may be an offer to open a new reward account, or the like.

For example, offer 205 can be distributed on a physical item such as a poster, or the like that includes a visual code such as a barcode, a QR code, a number to text, an email address to reply to, or the like. In another embodiment, offer 205 is received by the user's mobile device, e.g., via a beacon broadcast, WiFi broadcast, email, text, SMS, social media alert, app alert, or the like. In yet another embodiment, offer 205 is provided by an app on the user's mobile device that will present offer 205 once the mobile device is within a certain vicinity of the store providing the offer.

With reference now to 310 of FIG. 3A, one embodiment receives a device identifier associated with a user's mobile device 110, the receiving in response to a user responding electronically to the offer on the user's mobile device. Device ID 216 may be the mobile device's phone number, SIM card integrated circuit card identifier (ICCID), unique device identifier (UDID), or the like.

For example, as shown in FIG. 4A at 405 the user receives an offer 205 that requests a text be sent to 123 to apply for a new credit account. At 410 when the user texts "offer" to 123, the user's device ID 216 will also be provided with the text metadata.

With reference now to 315 of FIG. 3A, one embodiment receives a user identifier for the user. User ID 218 may be the user's zip code, social security number or portion thereof, driver's license number or portion thereof, or the like.

For example, as shown in FIG. 4A, at 415 the user receives a response that includes a URL. When the user clicks on the link, the user is led to a company page 431 that asks the user to provide a zip code and a last four of a social security number as the user ID 218. Although the last four of a social is shown as the user ID 218, it should be understood that the user ID 218 may be something other than the last four of a social security number, such as user's zip code, entire or a different portion of a social security number, the driver's license number or portion thereof, or the like; that is used to identify a specific user. In one embodiment, the company page 320 is a web page, a micro page or the like. After the user submits a response to page 431, the user ID 218 will be received. In one embodiment, the response will be providing the zip code associated with the user of the mobile device 110.

In another embodiment, 310 and 315 of FIG. 3A may be performed in a single step, such as shown in FIG. 4B. For example, at 455 of FIG. 4B, the offer asks the user to send her zip code as the initial response to receive the incentive. In so doing, when the user sends the zip code, both the user ID 218 (e.g., zip code) and the device ID 216, will be received. That is, in a single response from the user accepting the incentive offer.

Customer Information Acquisition

With reference now to 320 of FIG. 3A and as shown and expanded in the flowchart 350 of FIG. 3B, e.g., a method for utilizing the device identifier and the user identifier to obtain user specific information 223, one embodiment utilizes device ID 216 and user ID 218 to obtain user specific information 223 useable for a credit screen and/or to prepopulate an electronic form such as a credit application. In general, user specific information 223 could be one or more of: a name and full or partial address, a driver's license number, a social security number, or the like.

As shown at 321 of FIG. 3B, user specific information engine 220 may access one or more of a plurality of different search locations via the cloud 226. An example of cloud 226 is a network such as the Internet, local area network (LAN), wide area network (WAN), or the like.

As described at 322 of FIG. 3B, one embodiment uses the device ID 216 and user ID 218 information to perform a proprietary search 5 of a proprietary database 16. In general, the proprietary database 16 may be one or more databases that store a company's private database such as an Alliance Data Legacy database or the like. Proprietary database 16 will include user specific information 223 for customers that have existing accounts with the company, have previously applied for an account, or the like.

With reference now to 323 of FIG. 3B, in one embodiment, user specific information 223 that is found in the proprietary database 16 will be verified using a confidence factor threshold. For example, a confidence factor determination will be made by looking at the returned records to determine a confidence value. For example, if only one record is found and it is 5 days old, the confidence in the found records would likely be below the confidence factor threshold. In contrast, if 2 years of records are found, records such as prior accounts, present accounts, memberships, rewards information, and the like, then the confidence factor in the user specific information 223 found in the records would be above the confidence factor threshold. If the user specific information 223 does pass the confidence factor threshold, then the user specific information 223 is returned via return information 12 to user specific info engine 220 and then passed on to credit account builder 230 as discussed and shown in FIG. 2B.

With reference now to 324 of FIG. 3B, if the user specific information 223 cannot be found on the proprietary database, or if the user specific information 223 found does not overcome the confidence factor threshold, one embodiment uses the user ID 218 and device ID 216 information to perform a search of a secondary source database 26. Examples of secondary source databases include Internet engines such as Google or Yahoo, or credit reporting agency records such as those of Equifax or Experian, and the like. In one embodiment, the user specific information 223 may be obtained by performing an internet search with the user ID 218 and the device ID 216. For example, the search may include social media sites, search engines, online public records, and the like.

As shown at 223 of FIG. 3B, in one embodiment the user specific information 223 is provided via return information 12 to user specific info engine 220 and then passed on to credit account builder 230 as discussed herein and shown in FIG. 1A.

In one embodiment, if no user specific information 223 is found by secondary source engine 28, or if the user specific information 223 found does not reach the threshold of the confidence factor, the user specific info engine 220 will receive a return empty 39.

With reference now to 325 of FIG. 3A, one embodiment utilizes user specific information 223 to perform a credit screening. In one embodiment, the credit screening is performed based on information obtained from a credit reporting agency. However, in another embodiment, the credit screening will be based on other aspects, such as, but not limited to, the user's mobile carrier account history, the user's home ownership and the like. For example, if a user is identified as being a home owner, the offer of credit can be made without need of a credit screening being performed at a credit reporting agency.

In one embodiment, as shown in FIG. 4A, if the offer is to open a credit account then the user will be presented with a screen 432 that includes the found information being presented to the user. The user can confirm that the information is correct, and that information will then be used to prepopulate the forms at page 435 as described herein.

In one embodiment as shown in FIG. 4B, offer 205 is for a credit account. As such, the user may initially text for the credit account offer. Thus, looking at FIG. 4B, after the user texted the user ID 218 (at which time the device ID 216 would also be acquired) as shown in 455 and 460, the credit screening would occur. If the credit screening is successful, the flow would go to 435 were the user would be able to complete the application process.

With reference now to FIG. 4C the flow of 435 is shown in additional detail. In one embodiment, after the user applies for the credit offer, the user is directed to a credit application acceptance page(s). In one embodiment, credit application information is pre-filled with the information previously obtained as shown at screen shots 437-439.

In general, screen shot 437 is pre-filled with the information obtained by user specific info engine 220. That is, the information such as name, address, city, state, phone number, email and the like, would be prefilled. Thus, instead of having to type in the information, the user would simply verify that the information is correct and make any changes accordingly. Similarly, if some of the information was missing, the user would be able to fill in only the missing portions without having to complete the entire form. Thus, the user would see a significant number of keystroke reduction in the pre-filled forms which would increase throughput, decrease frustration and the time needed to fill out the forms.

Once verified, the user would go to next screen shot 438 where additional application information would be needed. In screen shot 438, the information includes last 4 of SSN, date of birth, and income. However, it should be appreciated that the information on either of screen shot 437, 438 or 439 may be different, to include less, additional, or other information.

Once the user had completed filling out the information on screen shot 438 (some of which may also be auto-filled depending upon the information requested), the user would hit the next button and then be provided with the terms and conditions as shown in screen shot 439. In one embodiment, the terms and conditions would include a signature portion. Once the user signed and submitted the terms and conditions screen shot 439, the user would then be presented with the new account information as described in 440.

With reference now to 330 of FIG. 3A, once the user passes the credit screening, one embodiment provides a credit application to the user via the user's mobile device.

Figure 3C:
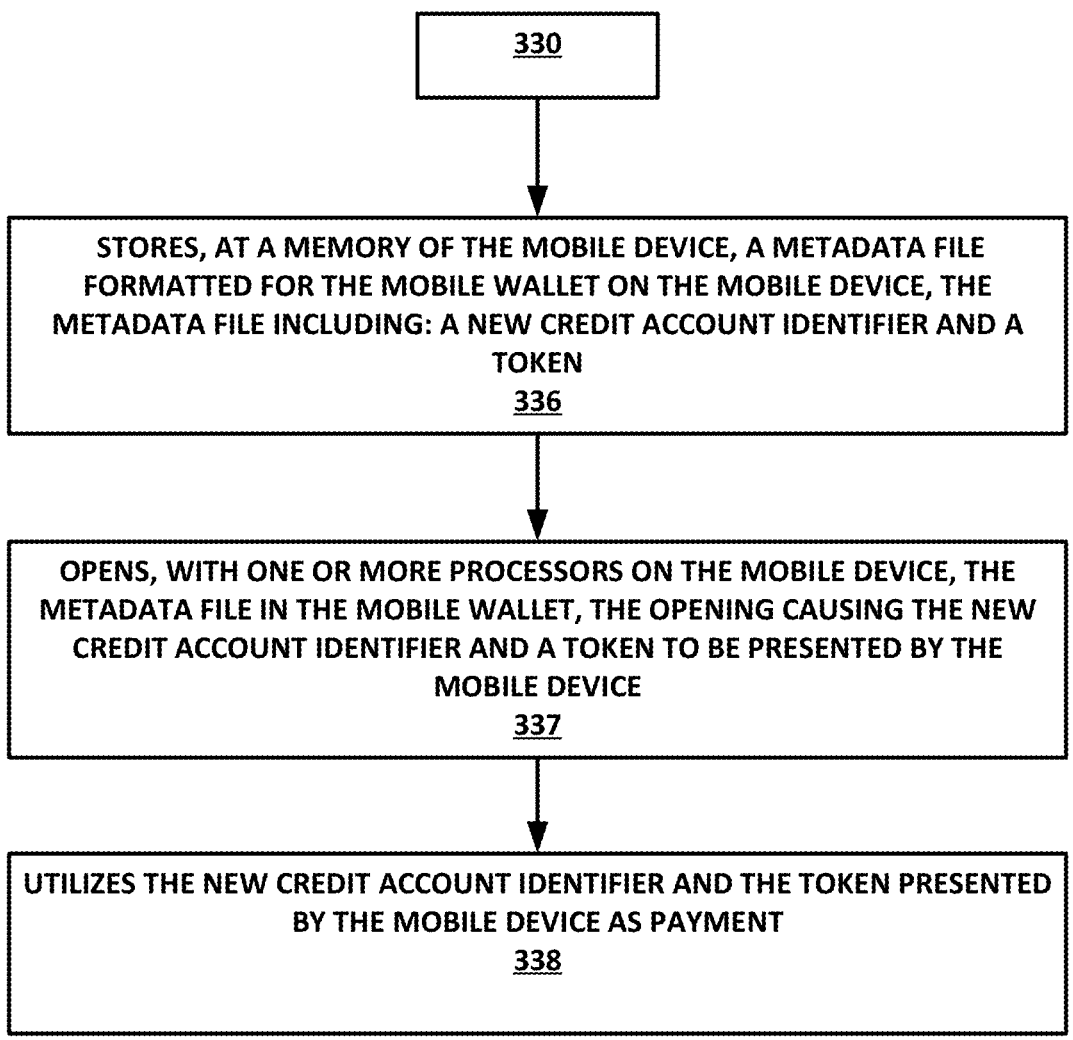
FIG. 3C is a flow diagram of a method for utilizing the new account in the mobile wallet of a mobile device, to make a transaction, in accordance with an embodiment.

FIG. 3C is a flow diagram 375 of a method for utilizing a new credit account 130 in mobile wallet 129 of a mobile device, to make a transaction, in accordance with an embodiment.

Referring now to 336 of FIG. 3C, one embodiment stores, at a memory of the mobile device, a metadata file formatted for the mobile wallet 129 on the mobile device 110. The metadata file 270 including the new credit account 130 and a token.

With reference now to 337 of FIG. 3C, one embodiment opens, with one or more processors on the mobile device 110, the metadata file in mobile wallet 129, the opening causing new credit account 130 to be presented by the mobile device 110. For example, after the metadata file 270 is added to the customer's mobile wallet 129, new credit account 130 would be accessible in the mobile wallet in the same way that any other items are accessed by mobile wallet 129. In one embodiment, the metadata file 270 could also include information that would make sure that the new credit account 130 opens on the top of the mobile wallet stack. For example, when the customer opened the mobile wallet application, new credit account 130 would be the first in the stack that could include other payment cards, tickets, etc.

Figure 5:
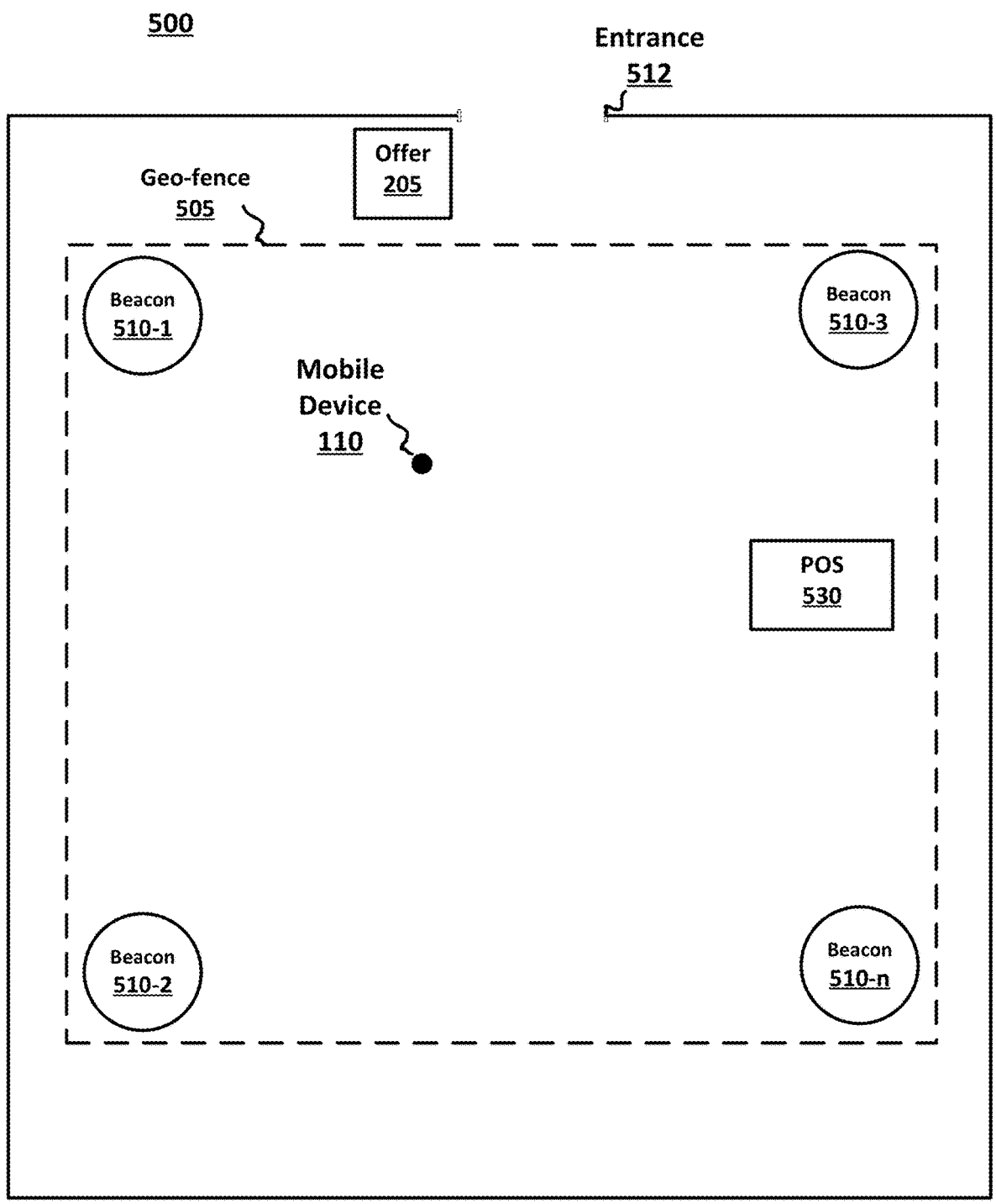
FIG. 5 is a block diagram that illustrates an embodiment of a retail establishment for mobile credit acquisition in accordance with an embodiment.

With reference now to 338 of FIG. 3C and to FIG. 5, one embodiment utilizes the new credit account and (in one embodiment, the token) presented by the mobile device as payment at a POS, or other checkout system/location such as an associates mobile device, a kiosk, or via a checkout at a location other than the POS in the store via WiFi, NFC, a beacon, the customer's mobile device, or the like, etc.

For example, when the customer goes to a shop and during checkout intends to use a credit account linked to new credit account 130, the customer would present new credit account 130 to the POS (or other checkout system/location). When new credit account 130 is presented at checkout it could include the transmission of the token via a near field communication (NFC), a scan of the new credit account 130 image, a scanning of a digital credit account identifier 444 provided with new credit account 130, etc. In general, since the new credit account 130 has already been validated the token would be provided in conjunction with the information. The token, metadata, barcode, and/or the like would be provided from the POS to the credit account provider which would validate the token and link the purchase to the appropriate customer credit account. The credit account provider would then provide the authorization for the purchase to the POS and the transaction would be completed.

In one embodiment, the transaction could also include information from the device such as user biometric information, location information (e.g., provided by a GPS), the transaction time, the transaction date, etc. In one embodiment, the location information provided by the mobile device will include time and date stamp information. In another embodiment, the location, time and/or date could be obtained from the POS, a combination of the customer's mobile device and the POS, etc.

In one embodiment, for the transaction to occur, new credit account 130 would be validated using the internet connection from the POS, the biometric information for the customer (as provided via a token or the like) from the customer's mobile device, the location obtained from the mobile device, the time, the date of the transaction initiation, the mobile device identification number, etc.

In so doing, the security of the customer's new credit account 130 payment system would be seamless and nearly instantaneous to the customer and the associate ringing up the transaction, but would include a plurality of checks and balances performed by the credit account provider, the brand, or a fraud determining evaluator assigned to make fraud mitigation determinations and/or evaluations.

With reference now to 440 of FIGS. 4A-4C, one embodiment provides the new credit account 130 to the mobile wallet 129 on the user's mobile device 110. In one embodiment, new credit account 130 is instantly available to be used as a form of payment. In one embodiment, new credit account 130, will include a digital credit account identifier 444 that can be presented on display 112 of mobile device 110. For example, digital credit account identifier 444 could be a QR code, bar code, digital image of a credit card, or other type of identifier for providing credit account information digitally to a POS.

One example of a digital credit account identifier 444 may include: the user's name, credit limit, store card account number, terms of use 446, a rotating GIF to prevent screenshots from being accepted at POS, a banner asking customer to present their ID to the associate to use the new credit account, or the like.

Referring now to FIG. 5, a top plan view of a retail store 500 is shown in accordance with an embodiment. In general, retail store 500 is any physical brick and mortar store that provides goods for sale at the store location. In one embodiment, retail store 500 includes an entrance 512. In addition, in different embodiments and configurations, retail store 500 can include one or more of, offer 205, geo-fence 505, beacons 510-1 through **510-*n*, point of sale (POS) 530**.

In one embodiment, the offer 205 may be provided based on the location of a user as determined by the user's mobile device 110. For example, if the location of the offer 205 is static, such as by the entrance 512 to retail store 500, then when the user's mobile device 110 utilizes information found in offer 205, it would be likely that the user is located near retail store 500. For example, the offer 205 may be a physical item such as a poster, or the like and include a visual code such as a barcode, QR code, or the like. As such, offer 205 may be scanned to be redeemed.

Similarly, if the offer is provided via a beacon such as one or more of beacons 510-1 through **510-*n* the user's mobile device 110 would have to be near, or in range of, the beacon broadcasting the offer. In another example, the offer is provided by an application on the user's mobile device 110 after the user enters into the area defined by geo-fence 505. In yet another embodiment, the offer is provided on the user's mobile device 110 when a location capability of the user's mobile device determines that the user's mobile device 110 is located near retail store 500. In general, near retail store 500 refers to a location such as, within the bounds of the store, within a few yards of the store, within the mall in which store 500 is located, within a beacon or WiFi broadcast range of store 500, or within a block of retail store 500**.

For purposes of the present discussion, the mobile device location service, can be, but is not limited to, GPS, WiFi, cellular service, beacon derived location determination and the like. Moreover, the location determined by the mobile device location service may be useful even at differing levels of accuracy. For example, a GPS enabled mobile device 110 can provide location information that is accurate to within a few meters while a cellular service, beacon or WiFi location capabilities of mobile device 110 can provide a location radius or location area. For example, the mobile device 110 being located within range of a beacon, within the overlapping area of a number of cellular service towers, etc.

For purposes of the discussion, geo-fence 505 refers to a virtual perimeter defining a real-world geographic area. Moreover, geo-fence 505 can be created by various means, one of which includes the use of beacons. For example, in FIG. 5, geo-fence 505 is a rectangle created by the locations of beacons 510-1, 510-2, 510-3, and **510-*n*. However, it should be appreciated that a beacon established geo-fence 505 can be any shape based on the number and location of beacons used to generate the geo-fence 505**.

In general, the one or more of beacons 510-1 through **510-*n* are devices that are configured to be communicatively coupled with user's mobile device 110, such as via near field communication (NFC), Bluetooth, WiFi, or the like. In one embodiment, one or more of beacons 510-1 through 510-*n*** is an iBeacon™, which is an indoor positioning system from Apple Inc. For example, the iBeacon is a low-powered, low-cost transmitter that can notify nearby iOS and/or Android devices of their presence. Although an iBeacon is provided as a specific example, the beacons are not limited to only that brand. Different beacons from other companies would also be acceptable.

Additionally, user's mobile device 110 can be enabled to look for the transmission of one or more of beacons 510-1 through **510-*n*. When user's mobile device 110** is within physical proximity to the beacon and detects it, the application can notify the user of the offer.

For example, the offer 205 may be provided to user's mobile device 110 while the user is within retail store 500 such as after the user enters geo-fence 505. In general, the offer 205 may be delivered via, a text message, e-mail, push message, other type of in App display, or the like. As described herein, the offer provides an opportunity for the user to receive an incentive.

Retail store 500 include a point of sale (POS) 530, and optionally one or more of a static offer 205, a geo-fence 505, and one or more of beacons 510-1 through 510-n. In one instance, the user's mobile device 110 may include a retail store 500 application but may not have a credit account therewith.

With reference now to FIG. 6, a flow diagram 600 for providing a customer security evaluation to determine that the customer whose is utilizing the mobile device is actually the customer authorized to access the new credit account in the mobile wallet, according to various embodiments. In general, the security pertains to determining that the customer whose is utilizing the mobile device is actually the customer whose is authorized to use the new credit account. The security described herein, enables authentication of the customer by way of biometrics. Biometrics can include, but are not limited to, thumb print scanning, voice detection, heart rate monitoring, eye/cornea detection, etc.

For example, in order for the new credit account 130 to be accessed on the mobile device 110, biometric information will be requested to ensure the customer requesting access to new credit account 130 is authorized to use the new credit account 130. In general, a number of different people may know the password (or other information) to access a customer's mobile device 110. The different people could be family, friends, co-workers, and the like. For example, mobile device 110 could be Dad's smart phone and the access password is known by his wife, son, daughter, a friend, etc. As such, each of the people that know the access password would be able to obtain access to Dad's smart phone. However, the new credit account 130 would require an additional biometric and location-based security solution before it can be accessed, the additional security solution being unrelated to the smart phone access.

As such, before the new credit account 130 could be accessed (and therefore prior to its use), the access requestor would have to pass the biometric and location-based security. In one embodiment, only Dad would be registered for access. However, in another embodiment, Dad and Mom (or another registered party) could both be able to obtain access via the biometric and location-based security while the children would not.

In addition to requiring biometric information, the transaction requirements could also include additional security parameters such as one or more of date, time and location. In one embodiment, the additional security parameters may be determined at the moment in which the biometric information is accessed at mobile device 110. Additionally, the security parameters may also be accessed by various features of the mobile device, such as a GPS 118.

For example, when the customer provides the biometric information (e.g., fingerprint) at mobile device 110, the additional security parameters (e.g., date, time, and location) are determined by GPS 118. In particular, in response to the provided biometric information, GPS 118 determines the physical location of the mobile device 110 that includes a time and/or date stamp. In one embodiment, location information could be obtained by a device separate from mobile device 110. For example, location information could be obtained by systems such as, but not limited to, a geo-fence, a node (e.g., a beacon, WiFi node, an RFID node, a mobile phone provider node), an address, a lat-long, or the like.

In one embodiment, location information that is obtained outside of the customer's mobile device is provided to mobile device 110 such that it can be transmitted along with (in conjunction with, appended to, provided within, etc.) the transaction request. In one embodiment, location information that is obtained outside of the customer's mobile device is transmitted separate from the transaction request or from a device other than the customer's mobile device 110, such as a POS, store mobile device, beacon, etc. In one embodiment, if the location information is transmitted separately, it will be tied to the transaction request via a common identifier, such as, but not limited to, a customer number, a customer's mobile device ID, or the like.

In one embodiment, if the biometric information is approved in combination with one or more of the additional security parameters, then the new credit account can be used to perform the purchase.

In one example, the customer may have pre-approved location parameters in order to be authenticated. That is, if a location of the customer (or customer's mobile device) is determined to be within a location parameter, then the new credit account 130 can be used. In the alternative, if a location of the customer is determined to be outside of a location parameter, then the new credit account 130 cannot be used. For example, if, at the time the biometrics are obtained and approved, the customer is within a 50-mile radius of his/her home address (which is the pre-approved location parameter), the customer is authenticated, and the new credit account 130 can be used. However, if, at the time the biometrics are obtained and approved, the customer is outside of the 50-mile radius of his/her home address (which is not a pre-approved location parameter), the customer is not authenticated, and the new credit account 130 cannot be used to make a purchase.

In one embodiment, pre-approved time and/or date parameters are used to enable customer authentication. For example, if a date and/or time at which the biometric information is obtained correspond to a pre-approved time and/or date, then the customer is authenticated (if the biometric information is also authenticated) and the new credit account 130 can be used. In one exemplary situation, the customer may have a pre-approved (or expected) time parameter of 9:00 AM to 7:00 PM. If biometric information is obtained in the time frame, then the customer is authenticated, and the new credit account 130 can be used. However, if the biometric information is obtained outside of the time frame, then even if the customer is authenticated, the new credit account 130 cannot be used for a transaction.

At 610, in response to a customer attempting to access the new credit account 130 on the mobile device 110, biometrics of the customer are obtained. For example, the security procedure to authenticate the customer includes accessing biometric information (e.g., fingerprint, voice, eye, etc.). The biometric information can be captured by mobile device 110 (e.g., scanning of a finger for the fingerprint, microphone for voice id, camera for facial/retina id, etc.).

At 620, one embodiment accesses a physical location of the mobile device. For example, when a customer attempts to use the new credit account for payment or even access the new credit account, the customer is authenticated. The security procedure for authentication includes accessing the physical location of the customer (which is the physical location of the mobile device assuming that the mobile device is in proximity to the customer). In one embodiment, the physical location is determined by GPS 118.

At 630, one embodiment determines a time at which the biometrics information was accessed. In one embodiment, the procedure could also include establishing a time when the physical location is determined. In one embodiment, a time stamp provided by GPS 118 is used to establish the time.

At 640, one embodiment determines a date at which the biometrics information was accessed. In one embodiment, the time stamp provided by GPS 118 is used to determine the date.

At 650, one embodiment allows a transaction capability for the new credit account 130 when the biometrics of the customer, the physical location of the mobile device, the time at which the biometrics were accessed, and the date when the biometrics are accessed; are within the security requirements. It is noted that any of the procedures, stated above, regarding flow diagram 600 may be implemented in hardware, or a combination of hardware with firmware and/or software. For example, any of the procedures are implemented by a processor(s) of a cloud environment and/or a computing environment.

Tracking Authorized Purchase

Figure 7:
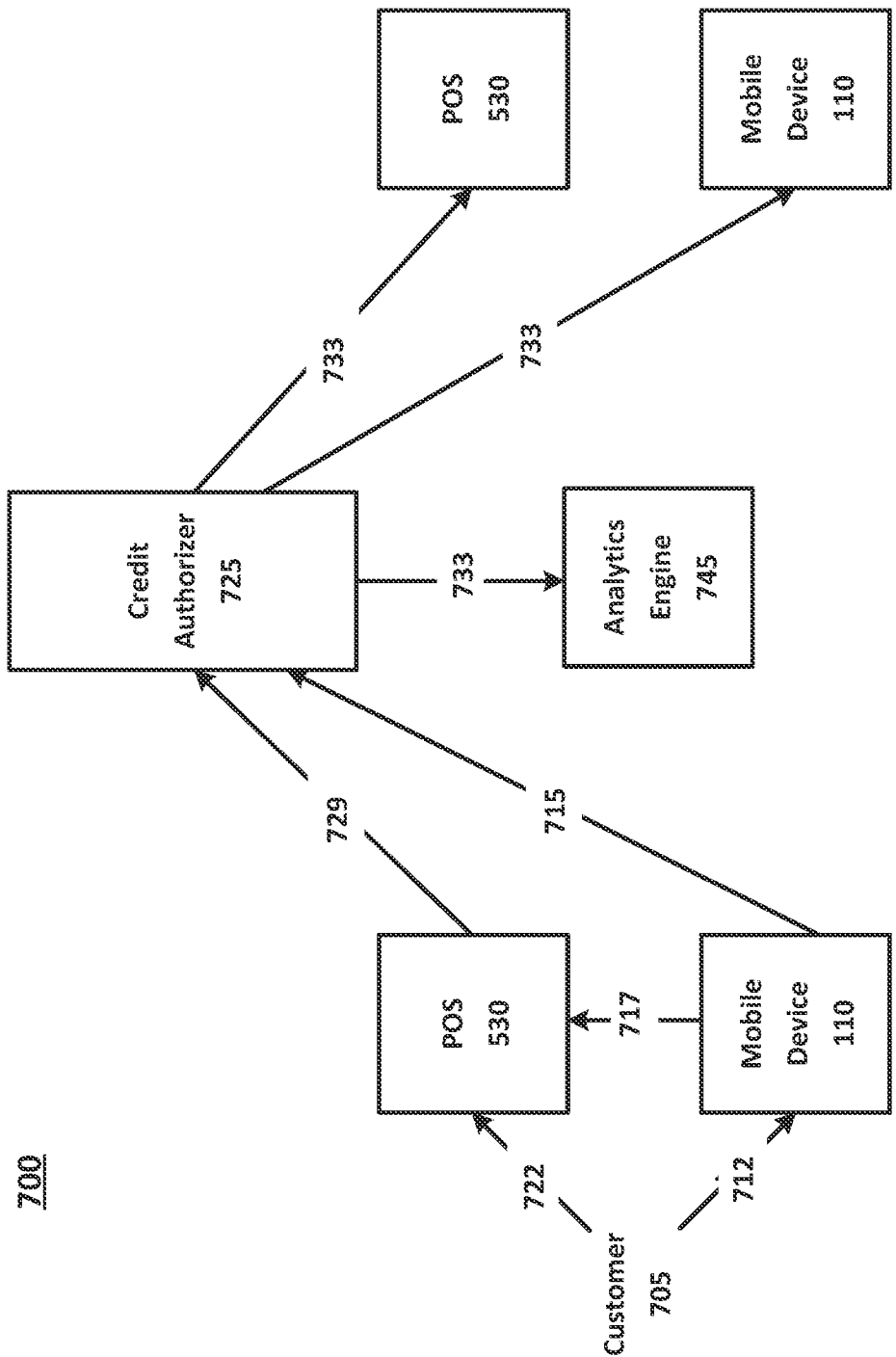
FIG. 7 is a block diagram of a system for tracking authorized purchases, in accordance with an embodiment.

Referring now to FIG. 7, a block diagram of a tracking authorized purchases system 700 is shown in accordance with an embodiment. FIG. 7 includes customer 705, mobile device 110, POS 530, credit authorizer 725, and analytics engine 745.

In one embodiment, customer 705 is a shopper/purchaser in a retail environment. Customer 705 is at the POS and is planning on making a purchase with a credit account. Mobile device 110 is a user's personal mobile device, such as but not limited to a mobile phone, smart jewelry, cell phone, tablet, notebook, or other electronic device with wired or wireless internet connectivity capable of performing one or more steps in the mobile payment process.

POS 530 is a retail sales device such as a cash register, tablet, or the like with wired or wireless internet connectivity. Credit authorizer 725 is the agent of the credit account being used and is providing an authorization for payment to the selling establishment. Analytics engine 745 is a data mining type system that receives and analyzes consumer/purchase data for underlying marketing, sales, offers, motivation, advertisement aspects, and the like.

Referring back to the customer 705, to make the purchase, customer 705 will either provide the payment information 722 to POS 530, or will authorize mobile payment 712 from the user's mobile device 110. In one embodiment, if customer 705 uses mobile device 110, then mobile device 110 will provide the payment information 717 to POS 530. In general, mobile device 110 may perform the mobile purchasing process or may have an application operating thereon that will perform the mobile purchasing process. In one embodiment, mobile device 110 may provide the payment information 715 directly to credit authorizer 725.

In one embodiment, POS 530 will provide identifying aspects 729 to credit authorizer 725. The identifying aspects 729 may include, but is not limited to, a request for authorization and the detail of the goods purchased. In another embodiment, the request for authorization and detail of the goods purchased is generated by the user's mobile device 110. In one embodiment, the request for authorization and detail of the goods purchased is generated by a combination of both the user's mobile device 110 and the POS 530.

In one embodiment, the identifying aspects will include information about the purchase such as, type of payment (e.g., mobile), customer identifier (e.g., mobile device identifier, account number, SSN, or the like), Store identifier (e.g., Store #, register #, clerk name/number, etc.), purchase amount, description of the goods purchased (e.g., manufacturer, make, model, color, size, etc.) and other aspects. In general, the different identifying aspects may be preset, user configurable or a combination thereof.

In one embodiment, credit authorizer 725 will provide an authorization number 733 containing the identifying aspects of the credit account transaction and detail of the goods purchased. In general, authorization number 733 will include the authorization for the purchase along with some or all of the information about the purchase such as, type of payment (e.g., mobile), customer identifier (e.g., mobile device identifier, account number, SSN, or the like), Store identifier (e.g., Store #, register #, clerk name/number, etc.), purchase amount, description of the goods purchased (e.g., manufacturer, make, model, color, size, etc.) and other aspects. In general, the different identifying aspects may be preset, user configurable or a combination thereof. An example of the authorization number 733 is shown in more detail in FIG. 9. Authorization number 733 will be provided to one or both of mobile device 110 and POS 530 and also to analytics engine 745. In so doing, analytics engine 745 will be able to begin performing analytics based on authorization number 733.

In other words, the analytics are provided by credit authorizer 725 at the time of the sale. Moreover, the analytics in authorization number 733 are obtained by analytics engine 745 without need to modify or upgrade POS 530. In one embodiment, the identifying aspects of the credit account transaction and detail of the goods purchased, or analytics based therefrom, are used to incentivize customers to use specific payment types (e.g., offers/promotions). In one embodiment, the analytics are used to understand purchase behavior, e.g., actual v. virtual (e.g., mobile pay); debit card purchases versus credit card purchases, and the like.

Figure 8:
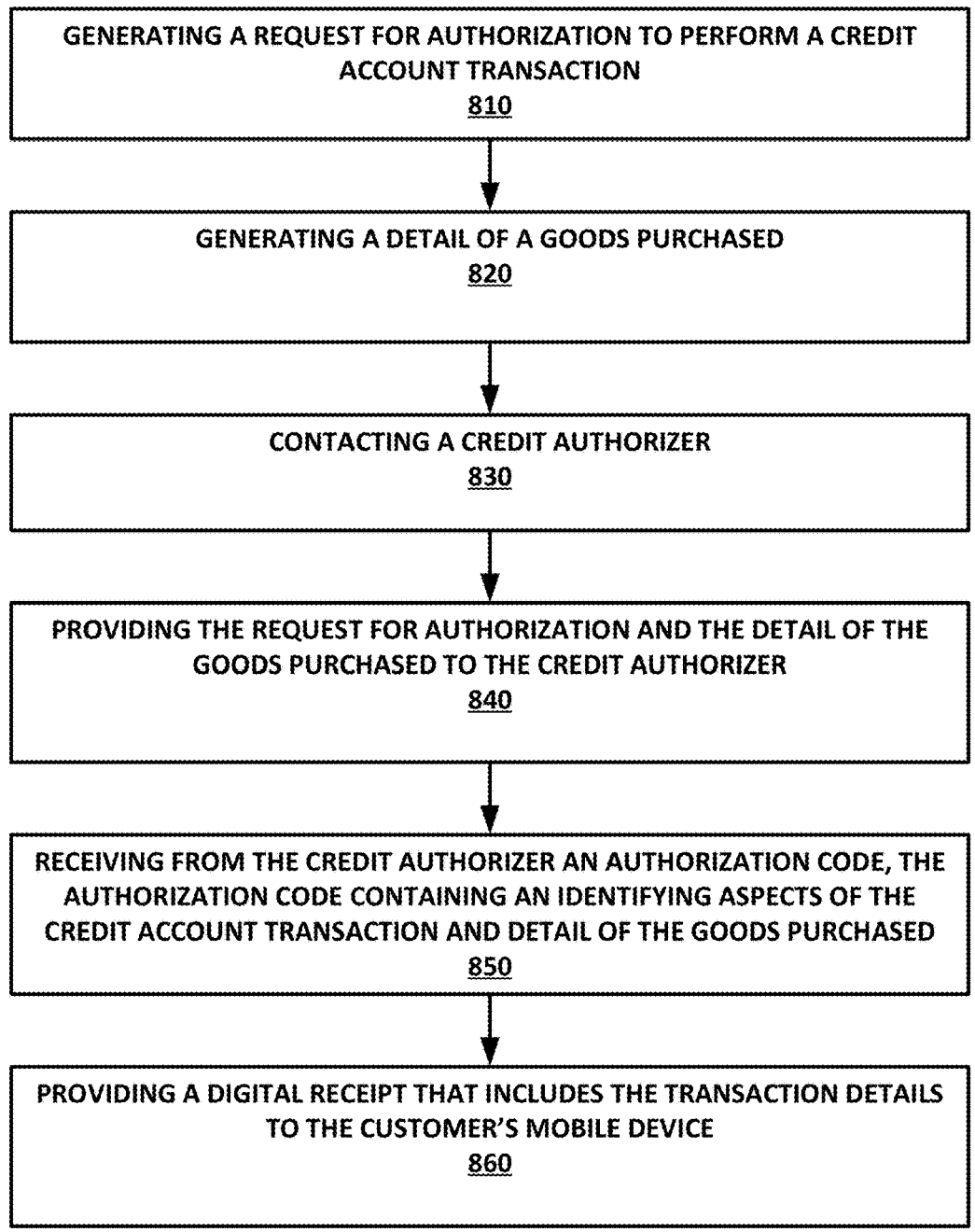
FIG. 8 depicts a flow diagram for a method for tracking authorized purchases in accordance with an embodiment.

With reference now to FIG. 8, a flow diagram 800 of a method for tracking authorized purchases is shown in accordance with an embodiment. With reference now to 810 of FIG. 8, one embodiment includes generating a request for authorization to perform a credit account transaction. In one embodiment, the credit account transaction is a virtual payment transaction. In other words, it is not based on a physical card being swiped but instead based on some identifier provided by the purchaser that will identify a virtual credit account to be used. E.g., accessed by a user identifier such as a driver's license, SSN, or other nonphysical credit account identifier.

In one embodiment, the credit account transaction is a mobile payment transaction with a mobile device. Again, the purchase is not based on a physical card being swiped but instead based on some identifier provided by the purchaser's mobile device that will identify a credit account to be used. For example, a screen shot, Bluetooth transmission, near field communication (NFC), bar code, UPC, or the like that can be presented by the purchaser's mobile device to the retailer POS 530, visually, electronically, communicatively, or the like.

In one embodiment, the credit account transaction is a mobile payment transaction with an application on a mobile device. Again, the purchase is not based on a physical card being swiped or presented at the POS 530, but instead based on some identifier provided by an application on the purchaser's mobile device that will identify a credit account to be used. For example, a screen shot, Bluetooth transmission, near field communication (NFC), bar code, UPC, or the like that can be presented by the application on the purchaser's mobile device to the retailer POS 530, visually, electronically, communicatively, or the like.

Referring now to 820 of FIG. 8, one embodiment includes generating a detail of the goods purchased. In one embodiment, the request for authorization and the detail of the goods purchased is generated by the POS 530. In another embodiment, the request for authorization and detail of the goods purchased is generated by the user's mobile device. In one embodiment, the request for authorization and detail of the goods purchased is generated by a combination of both the user's mobile device and the POS 530. In general, the detail of the goods purchased includes a customer identifier and a description of the goods purchased.

With reference now to 830 of FIG. 8, one embodiment includes contacting a credit authorizer 725. For example, when a private label client has an authorized purchase, such as through a mobile application, the mobile application will contact the credit authorizer 725 who will provide a one-time authorization number 733.

With reference now to 840 of FIG. 8, one embodiment includes providing the request for authorization and the detail of the goods purchased to the credit authorizer 725.

Referring now to 850 of FIG. 8, one embodiment includes receiving from the credit authorizer 725 an authorization number 733, the authorization number 733 containing identifying aspects of the credit account transaction and detail of the goods purchased. In general, the authorization number 733 is similar to a bank identification number (Bin), issuer identification number (IIN), or the like. Depending on the customer, the authorization number 733 will have a certain pre-defined number of digits. In one embodiment, the authorization number 733 will include a number of analytics. For example, when the customer makes a purchase, the POS 530 (or user's device) contacts the credit authorizer 725 and when the authorization number 733 is generated, it will include indicators at certain locations therein.

Thus, when the credit authorizer 725 provides the authorization number 733 that authorizes the purchase amount, the credit authorizer 725 will have access to the analytics in the authorization number 733 and will be able to use them to identify the transaction throughout the purchase life cycle, e.g., from authorization, through settlement all the way to billing.

For example, the identifying aspects will include information about the purchase such as, type of payment (e.g., mobile), customer identifier (e.g., mobile device identifier, account number, SSN, or the like), Store identifier (e.g., Store #, register #, clerk name/number, etc.), purchase amount, description of the goods purchased (e.g., manufacturer, make, model, color, size, etc.) and other aspects. In general, the different identifying aspects may be preset, user configurable or a combination thereof.

The technology then utilizes the identifying aspects for analytics without a need for modifying or upgrading the POS 530 device. For example, the entire purchase process remains the same for POS 530 and for customer. In addition, the generation of the one-time authorization number 733 remains unchanged. However, all of the authorization number 733 is no longer randomized and instead includes a number of analytics (e.g., identifying aspects). In one embodiment, the identifying aspects could be used by the store for evaluation purposes, such as, product placement (e.g., endcap, mid-shelf, mid-aisle, POS proximal display, etc.), proximity to other products purchased during the same transaction, etc. Such analytics could be used by the store to determine any number of metrics for store layout, product combinations, stale products, highest foot-traffic areas, best product movement locations, worst product movement locations, adjustments to store layouts, etc.

With reference now to 860 of FIG. 8, one embodiment electronically provides a digital receipt that includes one or more of the transaction details, to the customer's mobile device 110. The receipt could be provided via a push or a pull, through email, a text, to the app operating on the mobile device, over a cellular network, via WiFi, etc.

In one embodiment, the electronic receipt could include all of the identifying aspects, a single identifying aspect, or any subset thereof that includes a combination of at least two of the identifying aspects. For example, the electronic receipt could include a subset of the identifying aspects for the product purchased (e.g., manufacturer, make, model, color, size, etc.). In another example, the electronic receipt includes a larger subset of the identifying aspects that do not include any confidential information (e.g., customer address, SSN, customer ID, account number, mobile device ID, etc.). Thus, the identifying aspects provided on the electronic receipt may be preset, user configurable or a combination thereof. Moreover, the electronic receipt could include a link (or the like) that would allow a customer to make a further dive down into any of the associated identifying aspects. For example, in a dispute, the customer could look at the biometric identifier to see who was identified as making the purchase, select the store number and receive store location information, select the product information via a link for the product that would include identifying imagery, etc. Thus, the identifying aspects for the product purchased would be available for the customer to review in detail, for fraud analysis, for purchase behaviors, for store sales information, etc.

Figure 9:
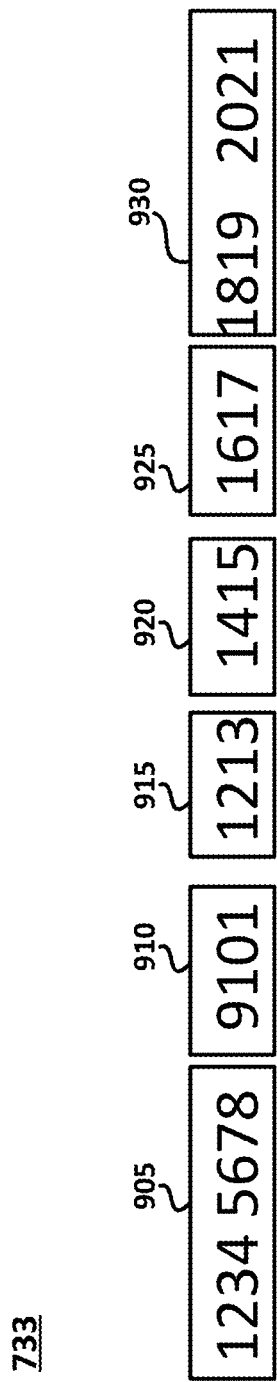
FIG. 9 depicts an embodiment of the tracking authorized purchases bin number in accordance with an embodiment.

Referring now to FIG. 9, an example of authorization number 733 is shown in accordance with an embodiment. In FIG. 9, authorization number 733 includes 32 digits, however, it should be appreciated that the number of digits is exemplary. The actual number of digits in authorization number 733 may be more or fewer. Moreover, the number of digits in authorization number 733 may be customer specific, credit type specific, an industry standard, a local or federal code or statute, or the like.

In FIG. 9, authorization number 733 includes 6 groupings 905-930, however, it should be appreciated that the number of groupings is exemplary. The actual number of groupings in authorization number 733 may be more or fewer. Moreover, the number of groupings in authorization number 733 may be customer specific, credit type specific, an industry standard, a local or federal code or statute, or the like. In general, groupings 905-930 refer to different aspects of information stored in authorization number 733.

For example, in one embodiment grouping 905 is the authorization to perform a credit account transaction. In one embodiment, grouping 905 may indicate date and time. Grouping 910 includes information about the purchase such as, type of payment (e.g., mobile). Grouping 915 includes information about the customer identifier (e.g., mobile device identifier, account number, SSN, or the like). Grouping 920 includes information about the store identifier (e.g., Store #, register #, clerk name/number, etc.). Grouping 925 includes information about the purchase amount, coupons used, discounts received, offers utilized and the like. Grouping 930 includes information such as the description of the goods purchased (e.g., manufacturer, make, model, color, size, etc.) and other aspects.

Although one example of the groupings is discussed herein, the discussion is exemplary. It should be appreciated that different identifying aspects may be preset, user configurable, or a combination thereof. Moreover, the size of the groupings for authorization number 733 may be configured differently based on the amount of data needed for a given grouping.

Thus, when the credit authorizer 725 provides the authorization number 733 that authorizes the purchase at the POS 530, the credit authorizer 725 will have access to the analytics/information in the authorization number 733 and will be able to use them to identify the transaction throughout the purchase life cycle, e.g., from authorization, through settlement all the way to billing.

Example Computer System Environment

With reference now to FIG. 10, portions of the technology for providing a communication composed of computer-readable and computer-executable instructions that reside, for example, in non-transitory computer-readable medium for storing instructions of a computer system. That is, FIG. 10 illustrates one example of a type of computer that can be used to implement embodiments of the present technology. FIG. 10 represents a system or components that may be used in conjunction with aspects of the present technology. In one embodiment, some or all of the components described herein may be combined with some or all of the components of FIG. 10 to practice the present technology.

FIG. 10 illustrates an example computer system 1000 used in accordance with embodiments of the present technology. It is appreciated that system 1000 of FIG. 10 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 10, computer system 1000 of FIG. 10 is well adapted to having peripheral computer readable media 1002 such as, for example, an external hard drive, a compact disc, a flash drive, a thumb drive, a wireless radio enabled device, and the like coupled thereto.

Computer system 1000 of FIG. 10 includes an address/data/control bus 1004 for communicating information, and a processor 1006A coupled to bus 1004 for processing information and instructions. As depicted in FIG. 10, system 1000 is also well suited to a multi-processor environment in which a plurality of processors 1006A, 1006B, and 1006C are present. Conversely, system 1000 is also well suited to having a single processor such as, for example, processor 1006A. Processors 1006A, 1006B, and 1006C may be any of various types of microprocessors. Computer system 1000 also includes data storage features such as a computer usable volatile memory 1008, e.g., random access memory (RAM), coupled to bus 1004 for storing information and instructions for processors 1006A, 1006B, and 1006C.

System 1000 also includes computer usable non-volatile memory 1010, e.g., read only memory (ROM), coupled to bus 1004 for storing static information and instructions for processors 1006A, 1006B, and 1006C. Also present in system 1000 is a data storage unit 1012 (e.g., a magnetic disk drive, optical disk drive, solid state drive (SSD), and the like) coupled to bus 1004 for storing information and instructions. Computer system 1000 also includes an optional alpha-numeric input device 1014 including alpha-numeric and function keys coupled to bus 1004 for communicating information and command selections to processor 1006A or processors 1006A, 1006B, and 1006C. Computer system 1000 also includes an optional cursor control device 1016 coupled to bus 1004 for communicating user input information and command selections to processor 1006A or processors 1006A, 1006B, and 1006C. Optional cursor control device may be a touch sensor, gesture recognition device, and the like. Computer system 1000 of the present embodiment also includes an optional display device 1018 coupled to bus 1004 for displaying information.

Referring still to FIG. 10, optional display device 1018 of FIG. 10 may be a liquid crystal device, cathode ray tube, OLED, plasma display device or other display device suitable for creating graphic images and alpha-numeric characters recognizable to a user. Optional cursor control device 1016 allows the computer user to dynamically signal the movement of a visible symbol (cursor) on a display screen of display device 1018. Many implementations of cursor control device 1016 are known in the art including a trackball, mouse, touch pad, joystick, non-contact input, gesture recognition, voice commands, bio recognition, and the like. In addition, special keys on alpha-numeric input device 1014 capable of signaling movement of a given direction or manner of displacement. Alternatively, it will be appreciated that a cursor can be directed and/or activated via input from alpha-numeric input device 1014 using special keys and key sequence commands.

Computer system 1000 also includes an I/O device 1020 for coupling system 1000 with external entities. For example, in one embodiment, I/O device 1020 is a modem for enabling wired or wireless communications between system 1000 and an external network such as, but not limited to, the Internet or intranet. A more detailed discussion of the present technology is found below.

Referring still to FIG. 10, various other components are depicted for system 1000. Specifically, when present, an operating system 1022, applications 1024, modules 1026, and data 1028 are shown as typically residing in one or some combination of computer usable volatile memory 1008, e.g. random access memory (RAM), and data storage unit 1012. However, it is appreciated that in some embodiments, operating system 1022 may be stored in other locations such as on a network or on a flash drive; and that further, operating system 1022 may be accessed from a remote location via, for example, a coupling to the internet. In one embodiment, the present technology, for example, is stored as an application 1024 or module 1026 in memory locations within RAM 1008 and memory areas within data storage unit 1012. The present technology may be applied to one or more elements of described computer system 1000.

System 1000 also includes one or more signal generating and receiving device(s) 1030 coupled with bus 1004 for enabling system 1000 to interface with other electronic devices and computer systems. Signal generating and receiving device(s) 1030 of the present embodiment may include wired serial adaptors, modems, and network adaptors, wireless modems, and wireless network adaptors, and other such communication technology. The signal generating and receiving device(s) 1030 may work in conjunction with one or more communication interface(s) 1032 for coupling information to and/or from system 1000. Communication interface 1032 may include a serial port, parallel port, Universal Serial Bus (USB), Ethernet port, Bluetooth, thunderbolt, near field communications port, WiFi, Cellular modem, or other input/output interface. Communication interface 1032 may physically, electrically, optically, or wirelessly (e.g., via radio frequency) couple computer system 1000 with another device, such as a mobile telephone, radio, or computer system.

The computing system 1000 is only one example of a suitable computing environment and is not intended to suggest any limitation as to the scope of use or functionality of the present technology. Neither should the computing environment be interpreted as having any dependency or requirement relating to any one or combination of components illustrated in the example computing system 1000.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A method comprising:
   electronically applying, via a mobile device, for a new credit account;
   receiving, on said mobile device, a metadata file formatted for a mobile wallet on the mobile device, the metadata file comprising:
     metadata causing a new credit account to be placed in a first location of said mobile wallet;
   providing, on said mobile device, biometric security to limit access to said new credit account, the biometric security being different than an input needed to access the mobile device;
   authenticating a user, with said mobile device and via said biometric security, prior to providing the user an access to said new credit account;
   utilizing said new credit account, at said mobile device, to initiate a mobile purchase; and
   receiving, at the mobile device and from a provider of the new credit account, a digital receipt, the digital receipt identifying one or more aspects of the mobile purchase.

2. The method of claim 1, further comprising:
   receiving a device identifier associated with a user's mobile device, said receiving in response to the user responding to a credit account offer via said user's mobile device;
   receiving a user identifier for said user;
   utilizing the device identifier and the user identifier for obtaining a user specific information useable for populating an application form for said credit account offer; and
   utilizing the user specific information to prepopulate the application form for said credit account offer to be presented to said user via said user's mobile device.

3. The method of claim 2, wherein said obtaining the user specific information comprises:
   performing a proprietary database search for the user specific information;
   returning found user specific information; wherein if no user specific information is found during said proprietary database search, performing a secondary source database search for the user specific information; and
   returning the user specific information.

4. The method of claim 3, further comprising:
   utilizing a confidence factor threshold to validate said user specific information, such that only user specific information above said confidence factor threshold is utilized to populate the application form.

5. The method of claim 1, further comprising:
   receiving an authorization number with said digital receipt, the authorization number containing an identification of a plurality of aspects of the mobile purchase and a detail about goods purchased.

6. The method of claim 5, wherein the authorization number identifies a plurality of aspects of the mobile purchase, from the group consisting of: a type of payment, a customer identifier, a store identifier, an amount of the mobile purchase, and a description of the goods purchased.

7. The method of claim 1, wherein said biometric security comprises:
   receiving a fingerprint of the user; and
   receiving a voice sample from the user; and
   said authenticating comprises:
     determining that a physical location of said mobile device is within a pre-approved location perimeter; and
     determining that said biometric security identifies the user.

8. A non-transitory computer-readable storage medium having instructions embodied therein that when executed cause a computer system to perform a method comprising:
   electronically applying, via a mobile device, for a new credit account;
   receiving, on said mobile device, a metadata file for a mobile wallet on the mobile device, the metadata file comprising:
     metadata causing a new credit account to be placed in a first location of said mobile wallet;
   providing, on said mobile device, biometric security to limit access to said new credit account, the biometric security being different than an input needed to access the mobile device;
   authenticating a user, with said mobile device and via said biometric security, prior to providing the user an access to said new credit account;
   utilizing said new credit account, on said mobile device, to initiate a mobile purchase; and
   receiving, at the mobile device and from a provider of the new credit account, a digital receipt, the digital receipt identifying one or more aspects of the mobile purchase.

9. The non-transitory computer-readable storage medium of claim 8, further comprising:
   receiving a device identifier associated with a user's mobile device, said receiving in response to the user responding to a credit account offer via said user's mobile device;
   receiving a user identifier for said user;
   utilizing the device identifier and the user identifier for obtaining a user specific information useable for populating an application form for said credit account offer; and
   utilizing the user specific information to prepopulate the application form for said credit account offer to be presented to said user via said user's mobile device.

10. The non-transitory computer-readable storage medium of claim 9, wherein said obtaining the user specific information comprises:
    performing a proprietary database search for the user specific information;
    returning found user specific information; wherein if no user specific information is found during said proprietary database search, performing a secondary source database search for the user specific information; and returning the user specific information.

11. The non-transitory computer-readable storage medium of claim 10, further comprising:
    utilizing a confidence factor threshold to validate said user specific information, such that only user specific information above said confidence factor threshold is utilized to populate the application form.

12. The non-transitory computer-readable storage medium of claim 8, further comprising:
    receiving an authorization number with said digital receipt, the authorization number containing an identification of a plurality of aspects of the mobile purchase and a detail about goods purchased.

13. The non-transitory computer-readable storage medium of claim 12, wherein the authorization number identifies a plurality of aspects of the mobile purchase, from the group consisting of: a type of payment, a customer identifier, a store identifier, an amount of the mobile purchase, and a description of the goods purchased.

14. The non-transitory computer-readable storage medium of claim 8, wherein said biometric security comprises:
    receiving a fingerprint of the user; and
    receiving a voice sample from the user; and
    said authenticating comprises:
    determining that a physical location of said mobile device is within a pre-approved location perimeter; and
    determining that said biometric security identifies the user.

15. A mobile device comprising:
    one or more processors to:
    provide an electronic application for a new credit account;
    receive a metadata file for a mobile wallet on the mobile device, the metadata file comprising:
        metadata to cause a new credit account to be placed in a first location of said mobile wallet;
    provide biometric security to limit access to said new credit account, the biometric security being different than an input needed to access the mobile device;
    authenticate a user, with said biometric security, prior to providing the user an access to said new credit account;
    utilize said new credit account to initiate a mobile purchase; and
    receive a digital receipt, the digital receipt identifying one or more aspects of the mobile purchase.

16. The mobile device of claim 15, where the one or more processors are further to:
    receive a device identifier associated with a user's mobile device in response to the user responding to a credit account offer via said user's mobile device;
    receive a user identifier for said user;
    utilize the device identifier and the user identifier to obtain a user specific information useable to populate an application form for said credit account offer; and
    utilize the user specific information to prepopulate the application form for said credit account offer to be presented to said user via said user's mobile device.

17. The mobile device of claim 16, wherein to obtain the user specific information, the one or more processors are further to:
    perform a proprietary database search for the user specific information;
    return found user specific information; wherein if no user specific information is found during said proprietary database search, perform a secondary source database search for the user specific information; and
    return the user specific information.

18. The mobile device of claim 17, where the one or more processors are further to:
    utilize a confidence factor threshold to validate said user specific information, such that only user specific information above said confidence factor threshold is utilized to populate the application form.

19. The mobile device of claim 15, where the one or more processors are further to:
    receive an authorization number with said digital receipt, the authorization number including an identification of a plurality of aspects of the mobile purchase and a detail about goods purchased.

20. The mobile device of claim 15, wherein said biometric security comprises:
    a fingerprint of the user; and
    a voice sample from the user; and
    said authentication of the user causes the one or more processors to:
    determine that a physical location of said mobile device is within a pre-approved location perimeter; and
    determine that said biometric security identifies the user.

* * * * *